(12) United States Patent
Majewski et al.

(10) Patent No.: US 10,976,898 B2
(45) Date of Patent: Apr. 13, 2021

(54) APPROACH FOR ADVANCED USER NAVIGATION

(71) Applicant: Honeywell International Inc., Morris Plains, NJ (US)

(72) Inventors: Joseph Steven Majewski, Strongsville, OH (US); Joe Stough, Cleveland, OH (US); Don L. Brett, Poland, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/703,462

(22) Filed: Dec. 4, 2019

(65) Prior Publication Data

US 2020/0104019 A1    Apr. 2, 2020

Related U.S. Application Data

(63) Continuation of application No. 15/420,063, filed on Jan. 30, 2017, now abandoned, which is a continuation of application No. 12/411,201, filed on Mar. 25, 2009, now abandoned.

(51) Int. Cl.
*G06F 3/0482* (2013.01)

(52) U.S. Cl.
CPC ................... *G06F 3/0482* (2013.01)

(58) Field of Classification Search
CPC .................................................. G06F 3/0482
See application file for complete search history.

(56) References Cited

U.S. PATENT DOCUMENTS

| 6,104,399 | A  | 8/2000  | Volkel          |
| 6,259,074 | B1 | 7/2001  | Brunner et al.  |
| 6,292,188 | B1 | 9/2001  | Carlson et al.  |
| 6,842,668 | B2 | 1/2005  | Carson et al.   |
| 7,154,483 | B2 | 12/2006 | Kobayashi       |
| 7,206,647 | B2 | 4/2007  | Kumar           |
| 7,408,538 | B2 | 8/2008  | Hinckley et al. |

(Continued)

FOREIGN PATENT DOCUMENTS

EP       0434926 B1    8/1995

OTHER PUBLICATIONS

Cardio Manual, Secant Home Automation, 55 pages Mar. 2009 (Year: 2009).*

(Continued)

*Primary Examiner* — Rashawn N Tillery
(74) *Attorney, Agent, or Firm* — Seager, Tufte & Wickhem LLC

(57) ABSTRACT

A system for hierarchical navigation of menus on a screen and particularly from one menu to another menu at the same level of a menu hierarchy. The system may provide side-to-side movement between menu elements to more easily navigate the menu pyramid. It may facilitate access to the details of a list of devices by selecting next and previous devices in the list, without navigating back to the list. The system may provide an operator or user with a simple, convenient method of browsing the details of devices in a list without the need to move back and forth throughout the list. The display may automatically adapt to the disparate properties of each type of device in the list. Also, the displayed details may be unique for a characterization of each device but be rendered in a common format.

20 Claims, 29 Drawing Sheets

(56) References Cited

U.S. PATENT DOCUMENTS

| | | |
|---|---|---|
| 7,464,339 B2 | 12/2008 | Keenan, Jr. et al. |
| 7,693,591 B2 | 4/2010 | Hoglund et al. |
| 7,698,654 B2 | 4/2010 | Fong et al. |
| 8,127,229 B2 | 2/2012 | Inoguchi et al. |
| 8,554,374 B2 | 10/2013 | Lunacek et al. |
| 2004/0267385 A1 | 12/2004 | Lingemann |
| 2009/0178009 A1 | 7/2009 | Dotson et al. |
| 2010/0058224 A1 | 3/2010 | Chai et al. |
| 2010/0251184 A1 | 9/2010 | Majewski et al. |

OTHER PUBLICATIONS

Cardio Manual, Secant Home Automation Inc., 55 pages, prior to Mar. 25, 2009.

Example of Sort Feature of Microsoft Excel 1 page, Created Dec. 16, 2008.

Example of Sort Feature of Microsoft Internet Explorer, 1 page, Created Dec. 16, 2008.

Honeywell, "Introduction of the S7350A Honeywell WebPAD Information Appliance," Home and Building Control. Bulletin, 2 pages, Aug. 29, 2000; Picture of WebPad Device with touch screen, 1 Page; and screen shots of WebPad Device, 4 pages.

http://support.elgato.com/index.php?, "Elgato Systems Technical Support. How Do I Use the on Screen Menu?", 3 pages, printed Dec. 16, 2008.

http://www.microsoft.com/windowsmobile, "Using Tasks Application, Smartphone and PDA, Total Access," 1 page, printed Dec. 16, 2008.

Lennox, "Network Control Panel (NCP)," User's Manual, 18 pages, Nov. 1999.

* cited by examiner

APPROACH FOR ADVANCED USER NAVIGATION

This application is a Continuation of U.S. patent application Ser. No. 15/420,063, filed Jan. 30, 2017, which is a Continuation of U.S. patent application Ser. No. 12/411,201, filed Mar. 25, 2009. U.S. patent application Ser. No. 12/411,201, filed Mar. 25, 2009, is hereby incorporated by reference. U.S. patent application Ser. No. 15/420,063, filed Jan. 30, 2017, is hereby incorporated by reference.

Related patent applications include U.S. patent application Ser. No. 12/411,165, filed Mar. 25, 2009, entitled "MECHANISM FOR INTERFACING A DISPLAY SCREEN OF ANOTHER TECHNOLOGY WITH A COMPUTING PLATFORM"; U.S. patent application Ser. No. 12/411,183, filed Mar. 25, 2009, entitled, "A SMALL SCREEN DISPLAY WITH A DATA FILTERING AND SORTING USER INTERFACE"; U.S. patent application Ser. No. 12/411,193, filed Mar. 25, 2009, entitled "A SYSTEM FOR DEFINING A USER INTERFACE OF A REMOTE DISPLAY DEVICE"; U.S. patent application Ser. No. 12/411,134, filed Mar. 25, 2009, entitled "AN AUTOMATIC CONFIGURATOR OF DISPLAY OBJECTS"; U.S. patent application Ser. No. 12/411,080, filed Mar. 25, 2009, entitled "AN EMBEDDED COMPUTING SYSTEM USER INTERFACE EMULATED ON A SEPARATE COMPUTING DEVICE"; all of which are hereby incorporated by reference.

BACKGROUND

The invention pertains to navigation of menus and particularly menus on a screen display.

SUMMARY

The invention is an approach for hierarchical navigation of menus on a screen and particularly from one menu to another menu at the same level of a menu hierarchy.

DESCRIPTION

Figure 1A:
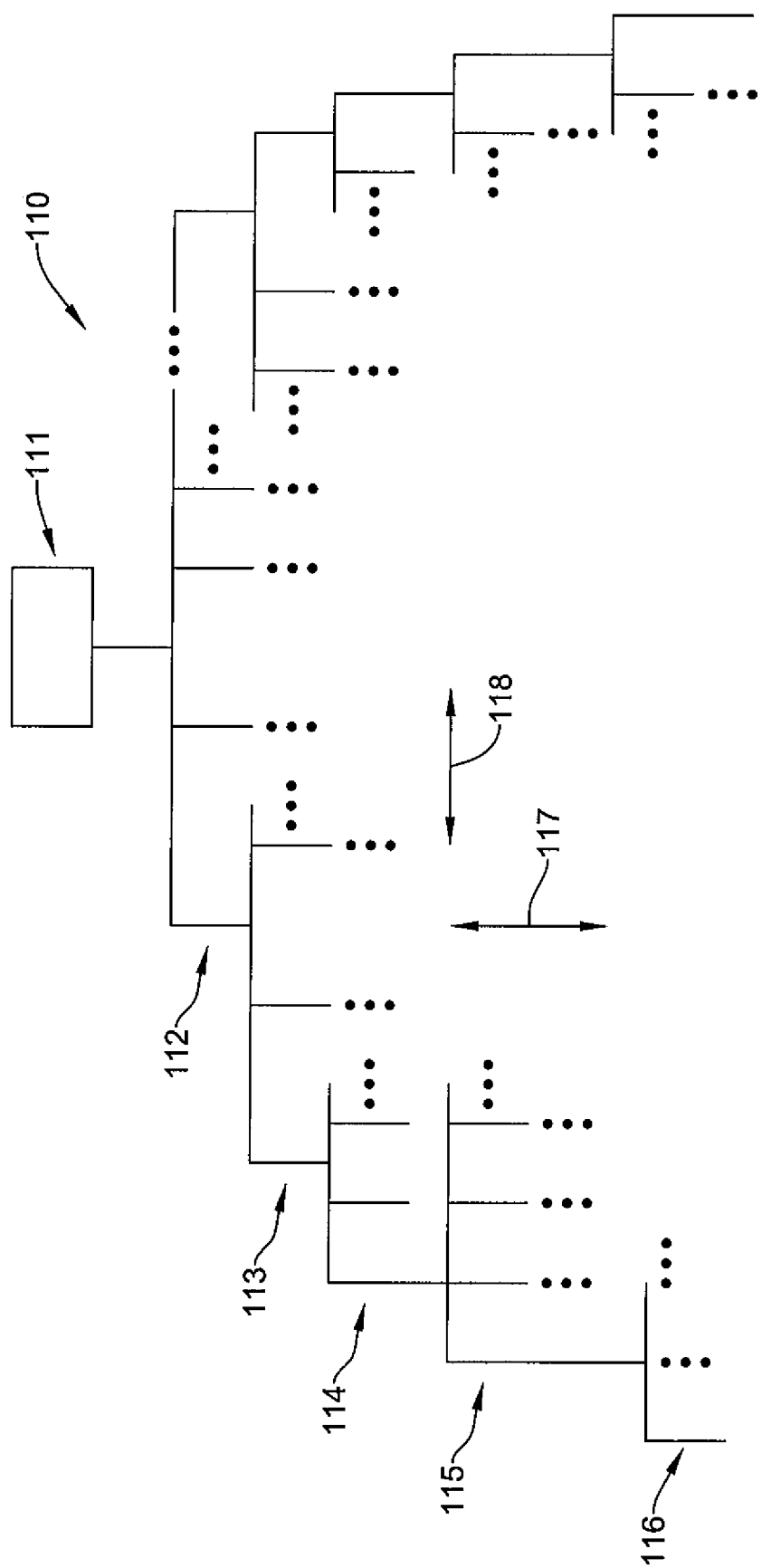
FIG. 1a is a diagram of a hierarchical structure of menus.

Many building automation systems (BAS) and/or building control systems may be fitted with a myriad of devices that are designed to fill specific equipment operational needs. These devices often require a centralized method of accessing, monitoring, and adjusting device settings. The intent of the present approach invention is to simplify the monitoring device that provides an operator with a clean and efficient view of the system.

Navigating the pyramid of menus available in a building automation system (BAS) or control system can become cumbersome and unwieldy. As the operator drills-down into the details of the system, the complexities of devices, settings and applications can become more challenging to grasp. The present approach may simplify the menu navigation.

The present approach (aka horizontal navigation) may provide side-to-side movement between menu elements to more easily navigate the menu pyramid. It may facilitate access to the details of a list of devices by selecting next and previous devices in the list, without navigating back to the list. A benefit of the present approach is that it may provide an operator with a simple, convenient method of browsing the details of devices in a list without the need to move back and forth throughout the list. The display may automatically adapt to the disparate properties of each type of device in the list. Also, the displayed details are unique for the characterization of each device but are rendered in a common format.

The display contents may be data-driven in nature. Although the display containers appear generic in nature, they may be data-driven in content, allowing them to be specific to the type of information being portrayed. No two displays need be identical or different, but a display may be characteristic of the content that it requires. Further navigation to deeper menus may be enabled by the dynamic content of the data.

The present navigation approach may eliminate keystrokes by removing the need to move back and forth. Devices may be accessed directly by selecting the previous or next item, without returning to the original menu. Time, effort and confusion may be minimized by enabling direct access to previous and next device selections.

Access to a multitude of displays may be enabled with minimal navigation. The entire pyramid of menus may be accessed with the least number of steps possible by eliminating the need for backtracking. Again, time, effort and confusion may be minimized by enabling direct access to previous and next device selections.

Side by side comparisons of operational settings of multiple devices may be accessed by simply browsing through them, rather than navigating through the pyramid of menus. Two or more devices may be compared or evaluated by simply switching between them with a single pair of buttons.

The mechanism of the present approach may be embedded into the display device programmatically. As a designer of the building automation system is configuring devices into the system, the designer may determine which devices will be exposed to the mechanism by including them into display containers. The contents of each of these containers are candidates to be operated-on by the mechanism. As each container and its contents are exposed to the mechanism, the mechanism may be free to traverse the items as desired.

Figure 1B:
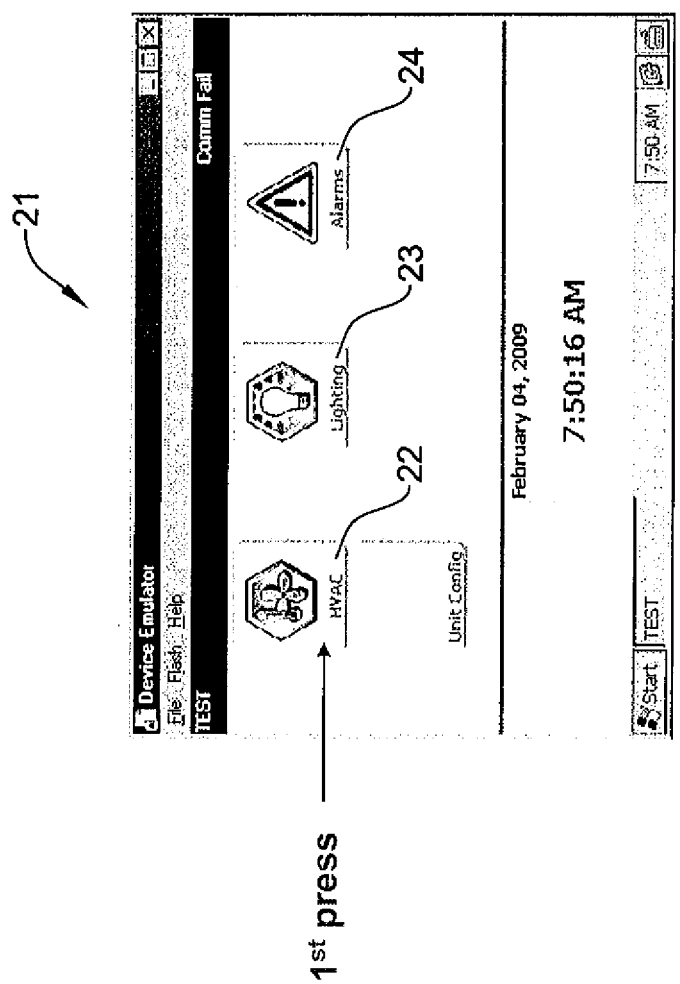
FIG. 1b is a diagram of a home screen on a display showing several of the components of a building automation system or building control system.
Figure 2:
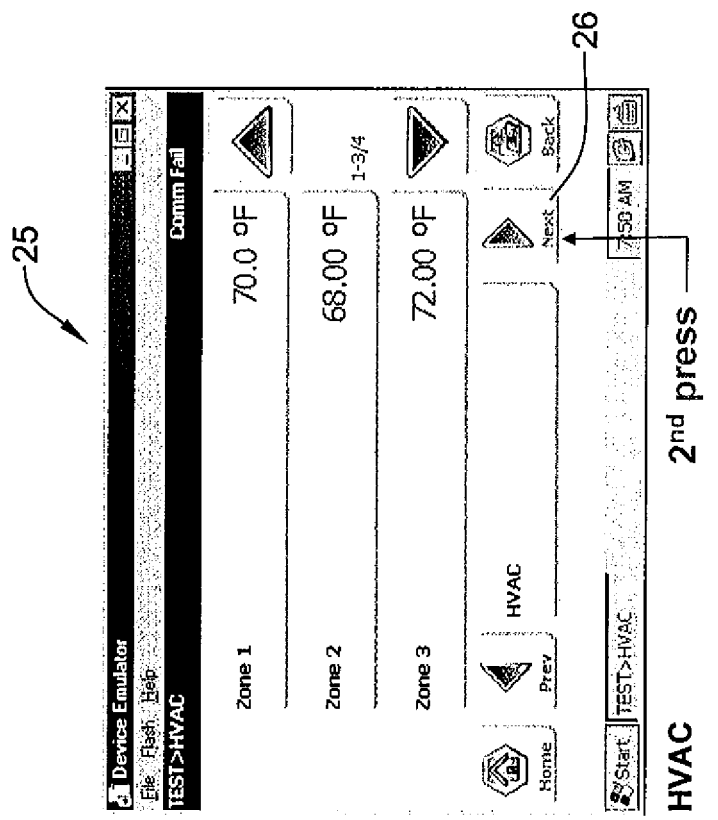
FIG. 2 is a screen showing zones for an HVAC.
Figure 3:
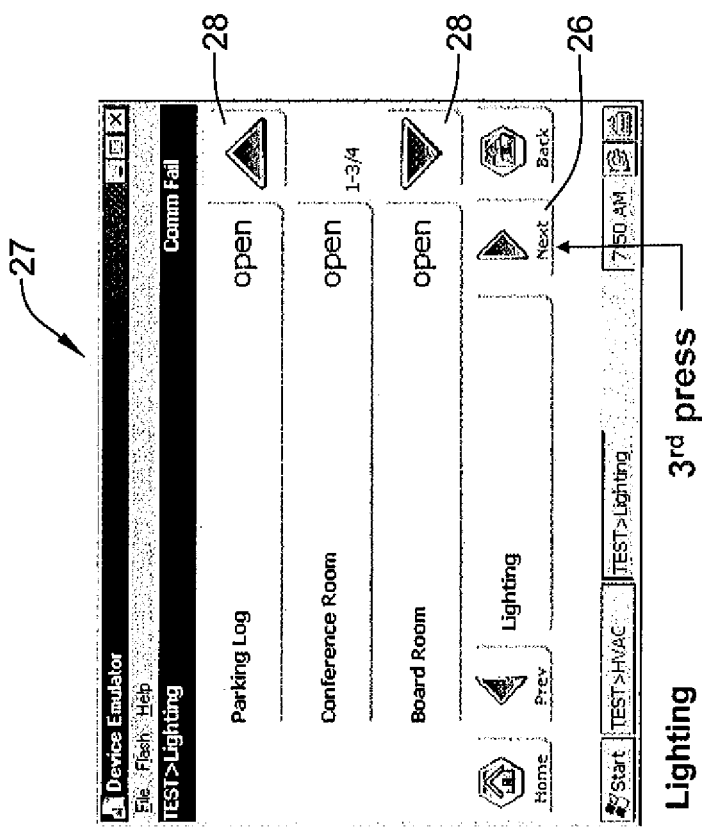
FIG. 3 is a screen for a lighting component at a level of the menu hierarchy.
Figure 4:
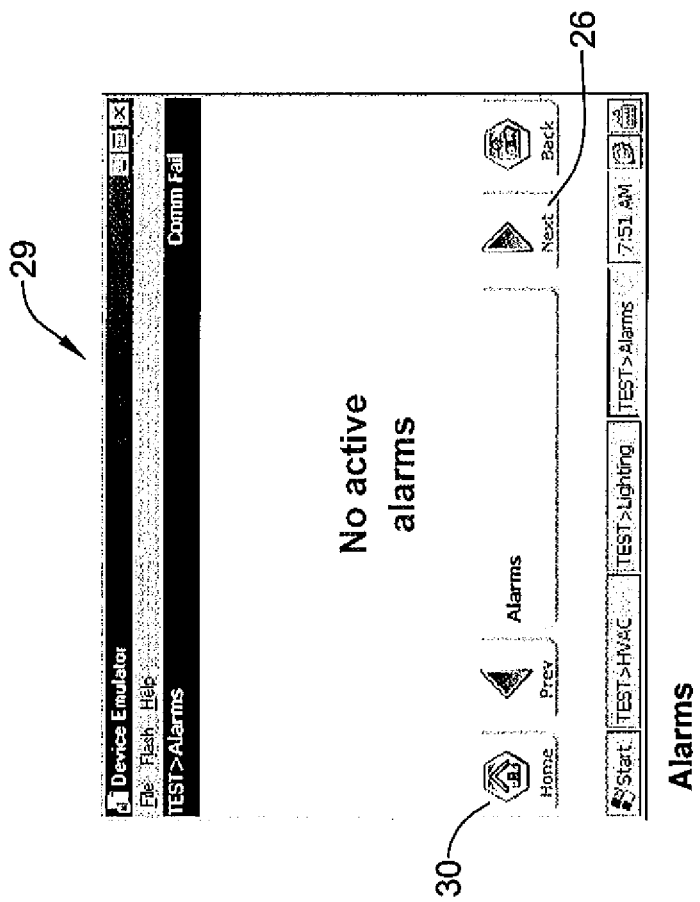
FIG. 4 is a screen for an alarm component.

FIG. 1a is a diagram of a hierarchical structure 110 of menus having levels 111, 112, 113, 114, 115, 116, and so on, as desired for a design at hand. For illustrative examples, level 111 could be a home screen level and level 112 could be a component level. One may laterally or horizontally move from one screen to another with movement 118 without the vertical movement 117. Returning to a more general level, such as level 111, may be done via vertical movement 117, for instance with an up or home button. FIG. 1b is a home screen 21 on a display showing several of the components of a building automation system or building control system. Home screen 21 may be regarded, for illustrative purposes, as a first or highest level of a menu hierarchy. The components, as represented by buttons 22, 23 and 24, may include HVAC, lighting and alarms, respectively. One may first press the HVAC button 22 to get a screen 25 in FIG. 2 showing three zones for HVAC and their respective temperatures. These HVAC zones may be regarded as at a second level of the menu hierarchy. A second press on a next button 26 which may result in a screen 27 shown in FIG. 3 for the lighting component at the second level of the menu hierarchy, i.e., the second hierarchical level which indicates the status of lighting in the parking lot, conference room and board room. Another area of lighting may be scrolled to by pressing up or down buttons 28. One may do a third press on the next button 26 to get screen 29 in FIG. 4 for the alarm component which at the moment indicates no active alarms. These presses of button 26 may provide horizontal movement from one component to another of the same hierarchical level.

Figure 5:
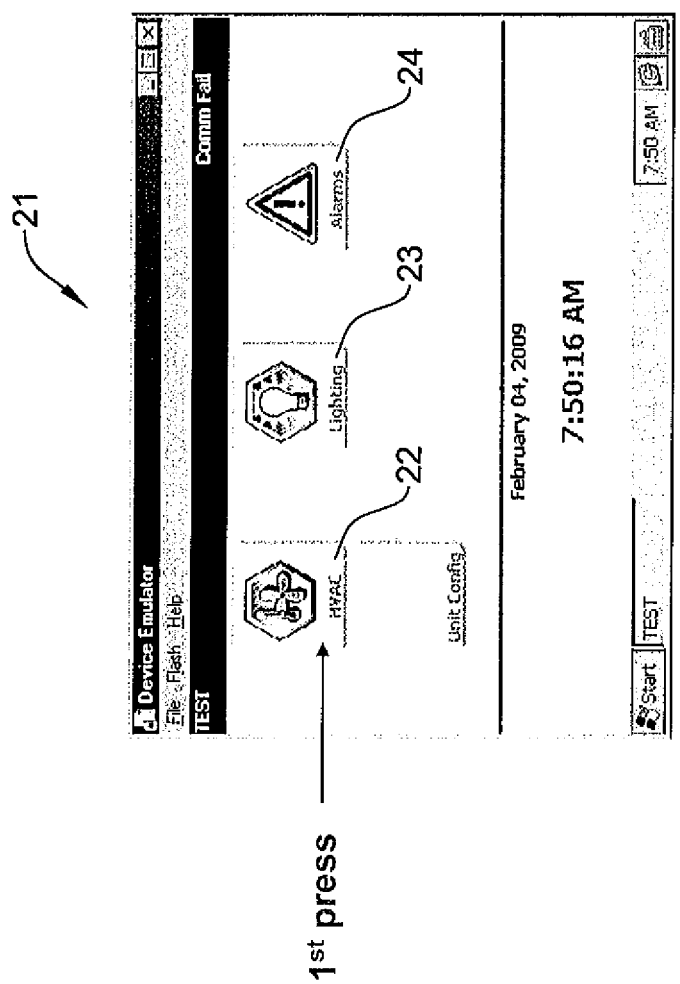
FIG. 5 is another home screen.
Figure 6:
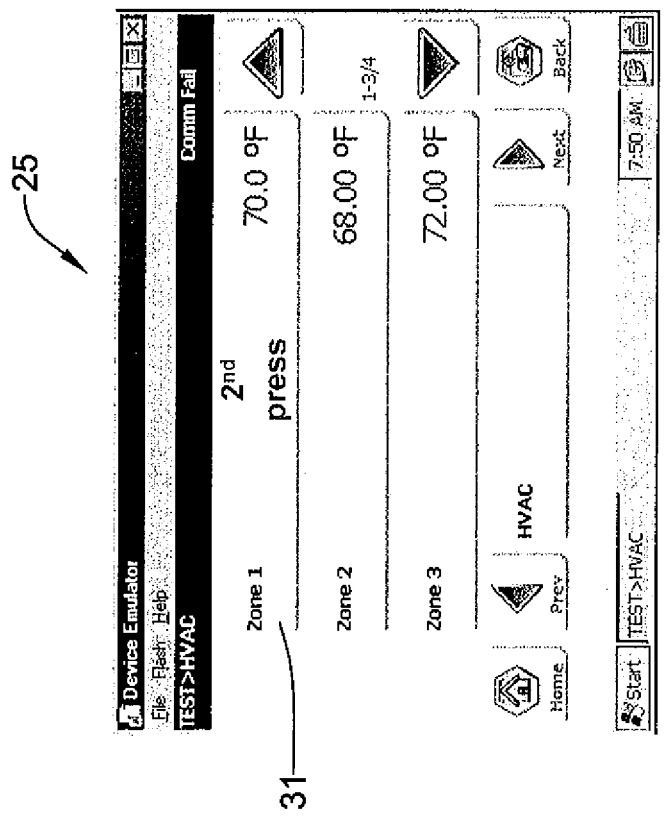
FIG. 6 is another screen of HVAC zones.
Figure 7:
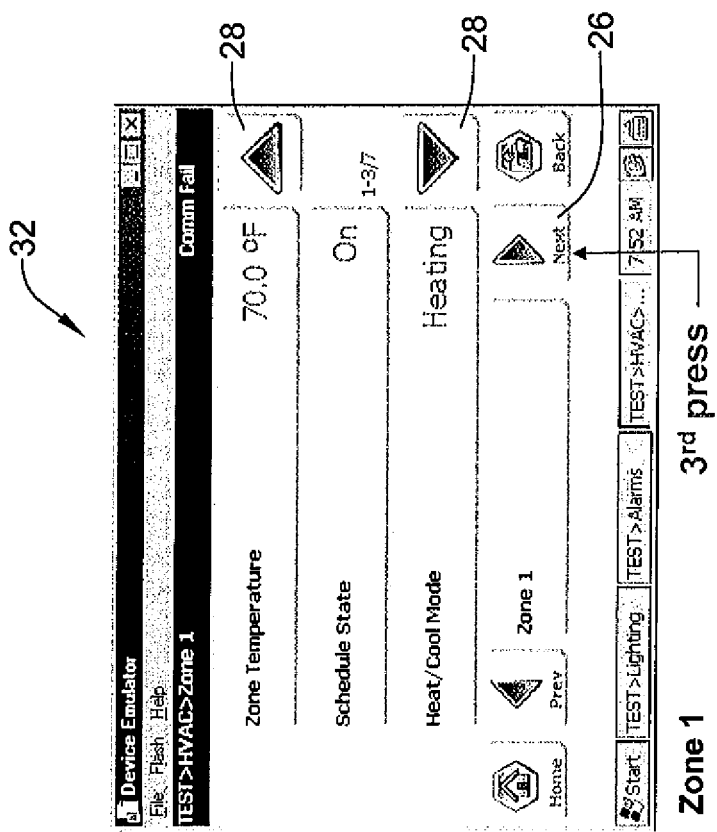
FIG. 7 is a screen of a zone having several items.
Figure 8:
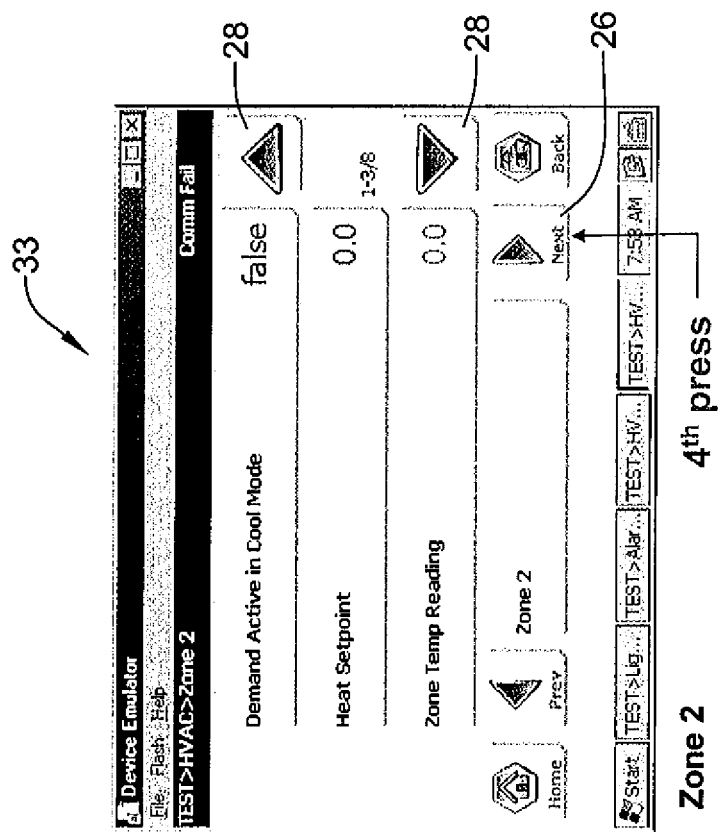
FIG. 8 is a screen of another zone with items at the same hierarchical level of the items of the zone in the screen of FIG. 7.
Figure 9:
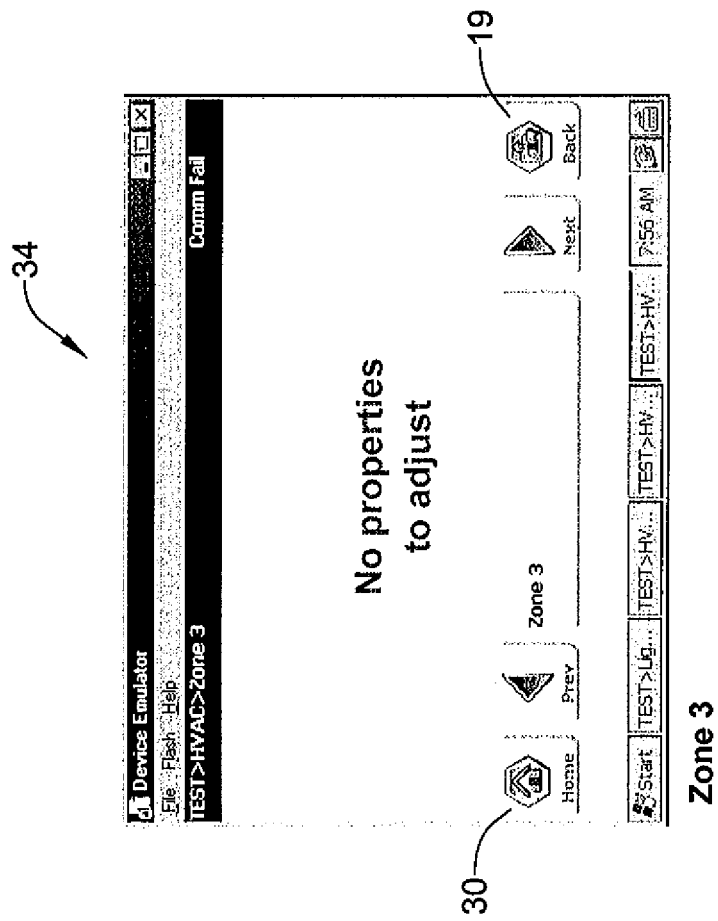
FIG. 9 is a screen of still another zone with items at the same hierarchical level of the items of the zones in the screens of FIGS. 7 and 8.

FIG. 5 shows a return to screen 21 which may be obtained by pressing the home button 30 upon which a first press of the HVAC component button 22 results in the screen 25, in FIG. 6, showing three HVAC zones at the second hierarchical level with their respective temperatures indicated. A second press may be made on a button 31 for zone 1 to get a screen 32 in FIG. 7 showing three items of zone temperature, schedule state and heat/cool mode for zone 1. These items may be regarded as at a third hierarchical level. Several other items in this level of zones may be viewed by pressing one of the scroll buttons 28. A third press of the next button may get a screen 33 in FIG. 8 which shows items of zone 2 of screen 25. This screen shows items still at the third hierarchical level but for zone 2, which amounts to a horizontal movement from zone 1 to zone 2 at the same level. Some of the items are demand active in cool mode, a heat setpoint and a zone temperature reading. Other items for zone 2 may be viewed by pressing one of the scroll buttons 28. A fourth press on the next button 26 may result in a screen 34 in FIG. 9 for items of zone 3 of screen 25, again a horizontal movement at the same level. Screen 34 indicates no properties to adjust for zone 3.

Figure 10:
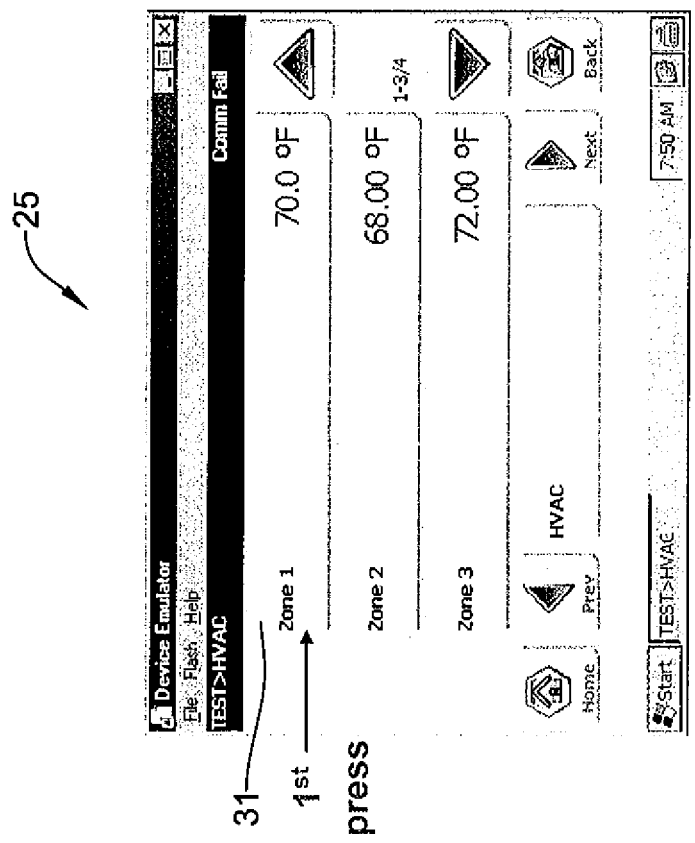
FIG. 10 is a screen of zones like that of FIG. 6.
Figure 12:
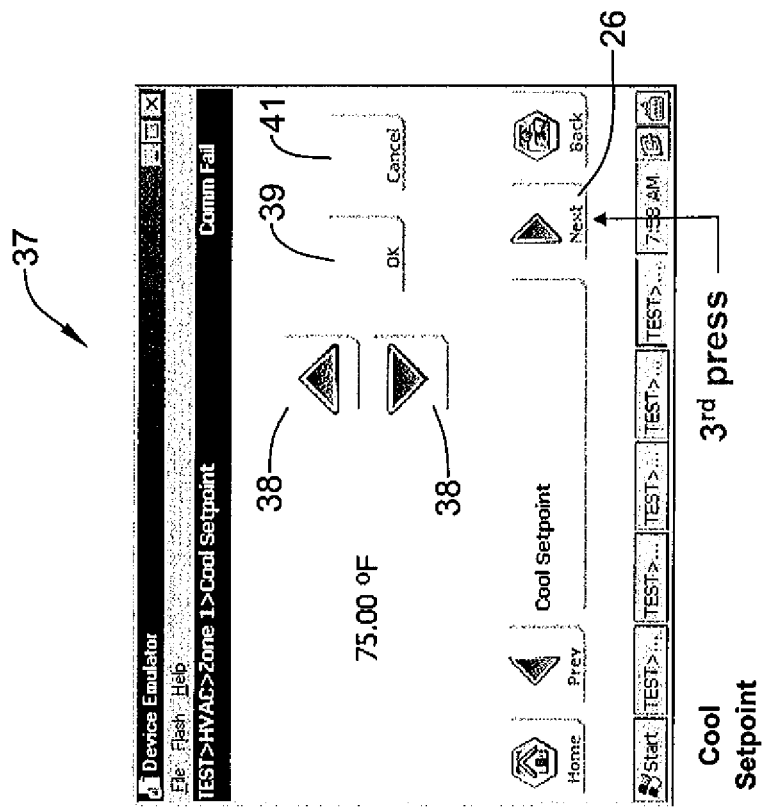
Figure 13:
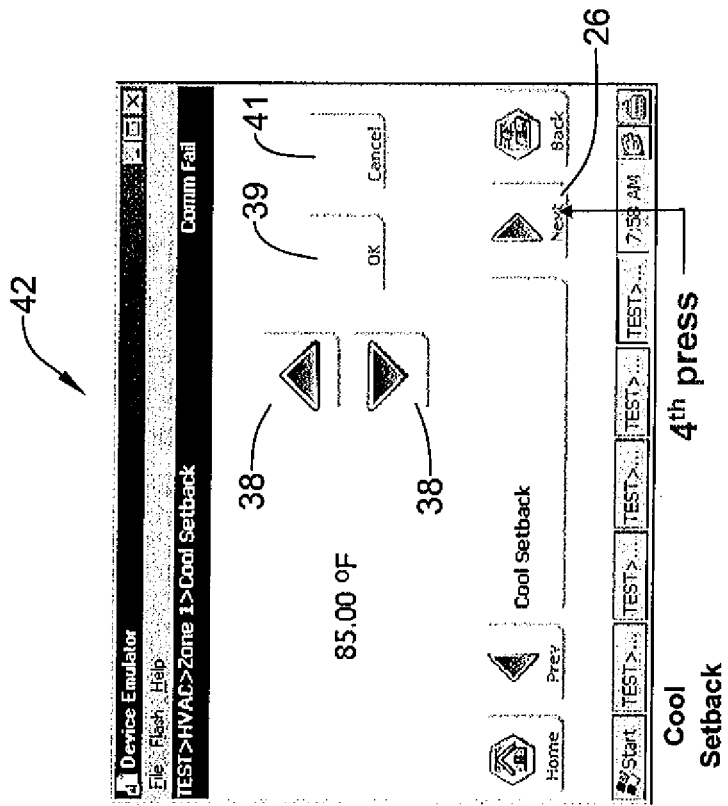

One may press a back button 19 or an up button to return to screen 25 at the second hierarchical level in FIG. 10, or pressing button 19 could mean returning to a previous screen. A first press may be made on button 31 for zone 1 to get a screen 35 in FIG. 11. Screen 35 shows zone 1 items at the third hierarchical level of cool setpoint, cool setback and heat setpoint. Other items for zone 1 at the third level may be viewed by pressing up and down scroll buttons 28. A second press may be made on cool setpoint 36 to get a screen 37 at a fourth hierarchical level for adjusting the cool setpoint for zone 1. The cool setpoint may be adjusted by pressing one of the up and down buttons 38. If there is a change made to the cool setpoint, the change may be accepted by pressing an OK button 39. The change may be rejected by pressing a cancel button 41. A third press on the next button 26 in FIG. 12 may result in a screen 42 in FIG. 13 for adjusting the cool setback for zone 1. The cool setback for zone 1 is at the same (fourth) hierarchical level as the cool setpoint for zone 1; this is a horizontal movement. There is no need to go up and down of the menu hierarchy to get from one item to another at the same level. The cool setback may be adjusted by pressing one of the up and down buttons 38. If there is a change made to the cool setpoint, the change may be accepted by pressing the OK button 39. The change may be rejected by pressing the cancel button 41.

Figure 11:
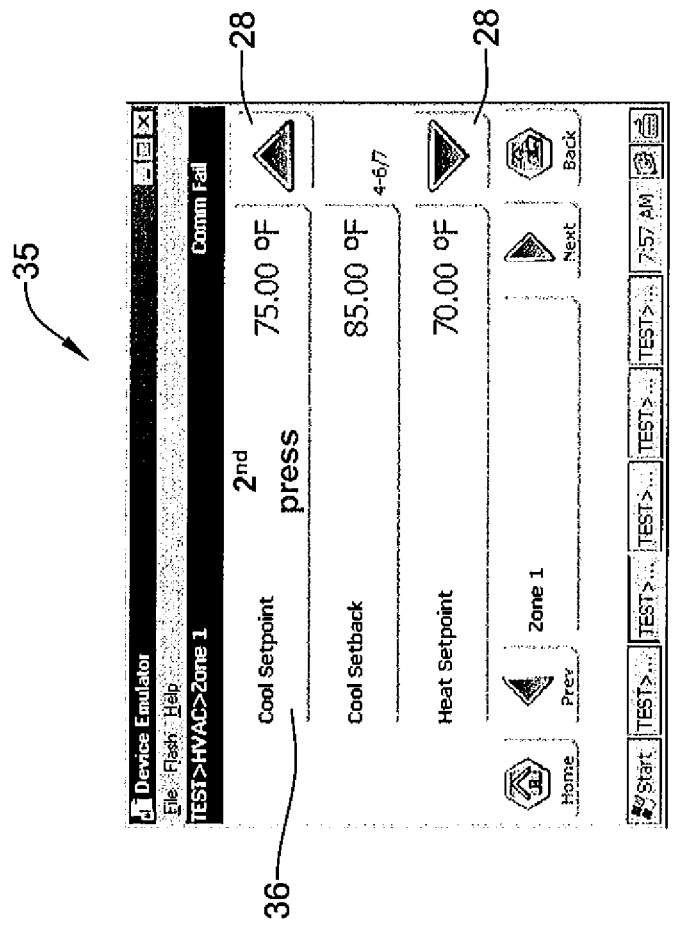
FIGS. 11-14 are screen illustrating movement among various levels of menus.
Figure 14:
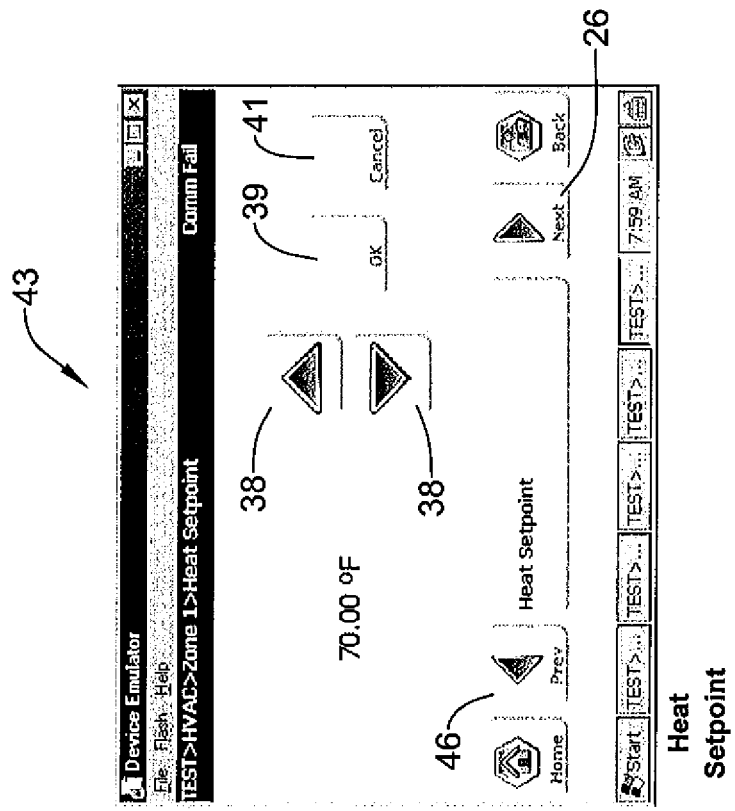

A fourth press on the next button 26 in screen 42 may result in a screen 43 in FIG. 14 showing the heat setpoint for zone 1, as shown in the list of items for zone 1 of screen 35 in FIG. 11. This amounts to another horizontal or lateral movement from an item adjustment screen at the fourth hierarchical level. The heat setpoint may be adjusted by pressing one of the scroll buttons 38. If there is a change made to the heat setpoint, the change may be accepted by pressing the OK button 39. The change may be rejected by pressing the cancel button 41. Another item of zone 1 at the same fourth level may be pulled up for adjustment by pressing the next button 26 in screen 43.

What FIGS. 1 through 14 appear to illustrate is an approach for user navigation. These Figures show that pressing the next button in a certain hierarchical level screen may move sequentially to another screen of another item at the same hierarchical level of the item in the previous screen. In other words, it seems that pressing a component or an item at an n level, results in details or items at an n+1 level of the component or item at the n level. Pressing the next button moves one to a screen at the n+1 level of another component or item at the n+1 level. The letter "n" may be an integer such as 1, 2 and so on of a designated level. Pressing a previous button 46 may result in a screen of the same level but for another component or item. FIGS. 1-14 may be regarded as showing an approach for user navigation.

Figure 15:
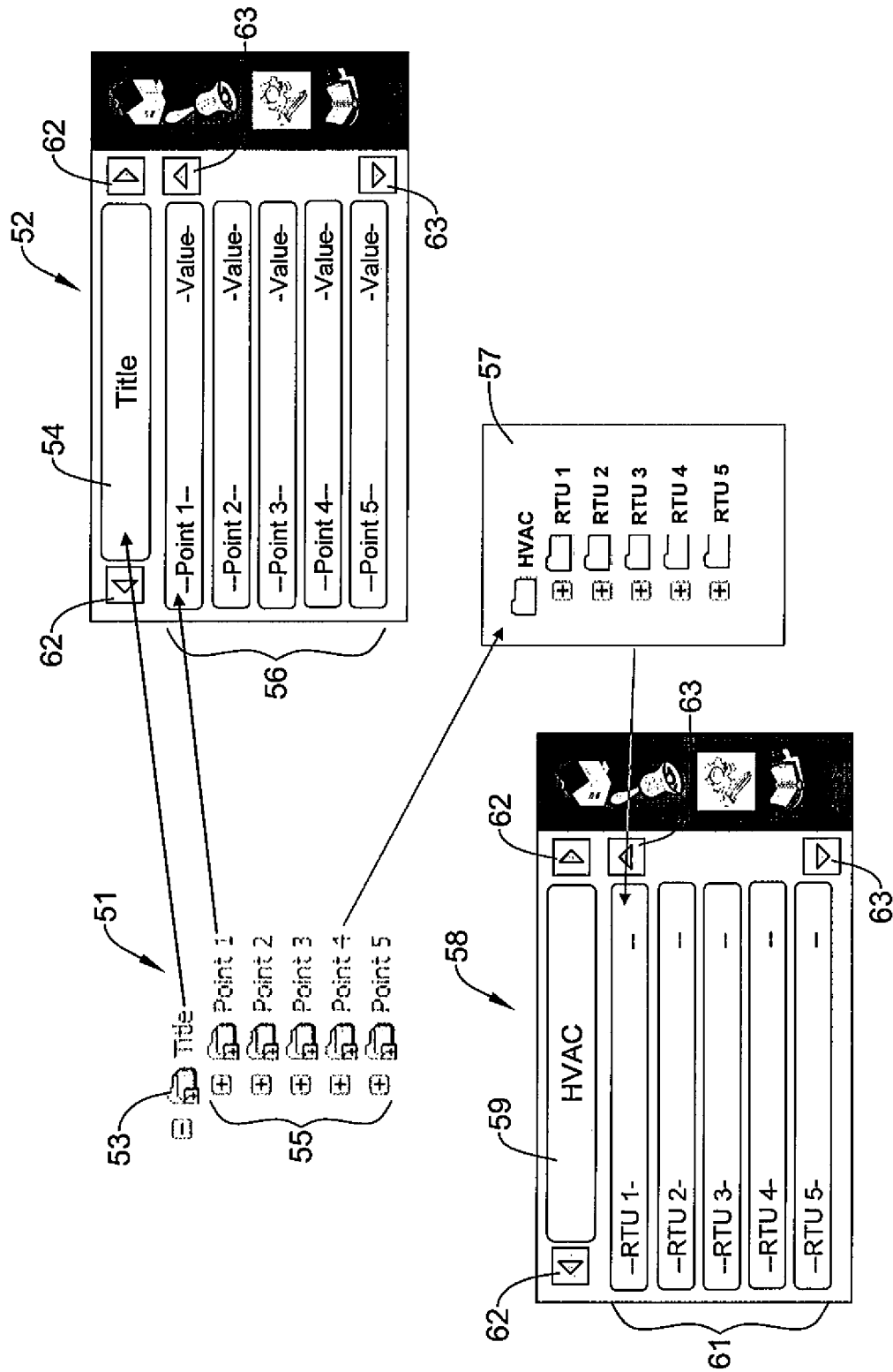
FIGS. 15-28 are line diagrams of menus at various levels movement among the menus.
Figure 16:
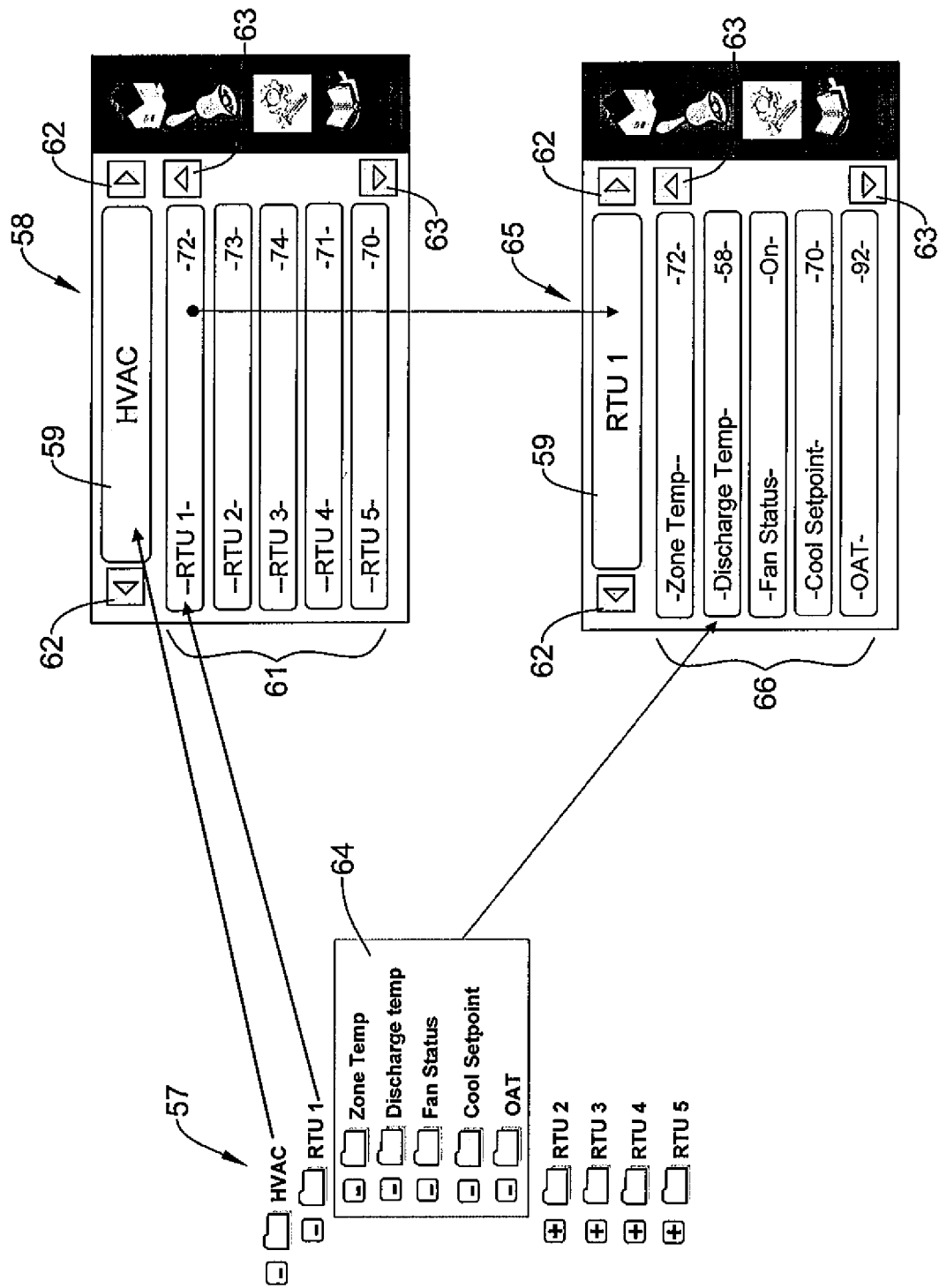
Figure 17:
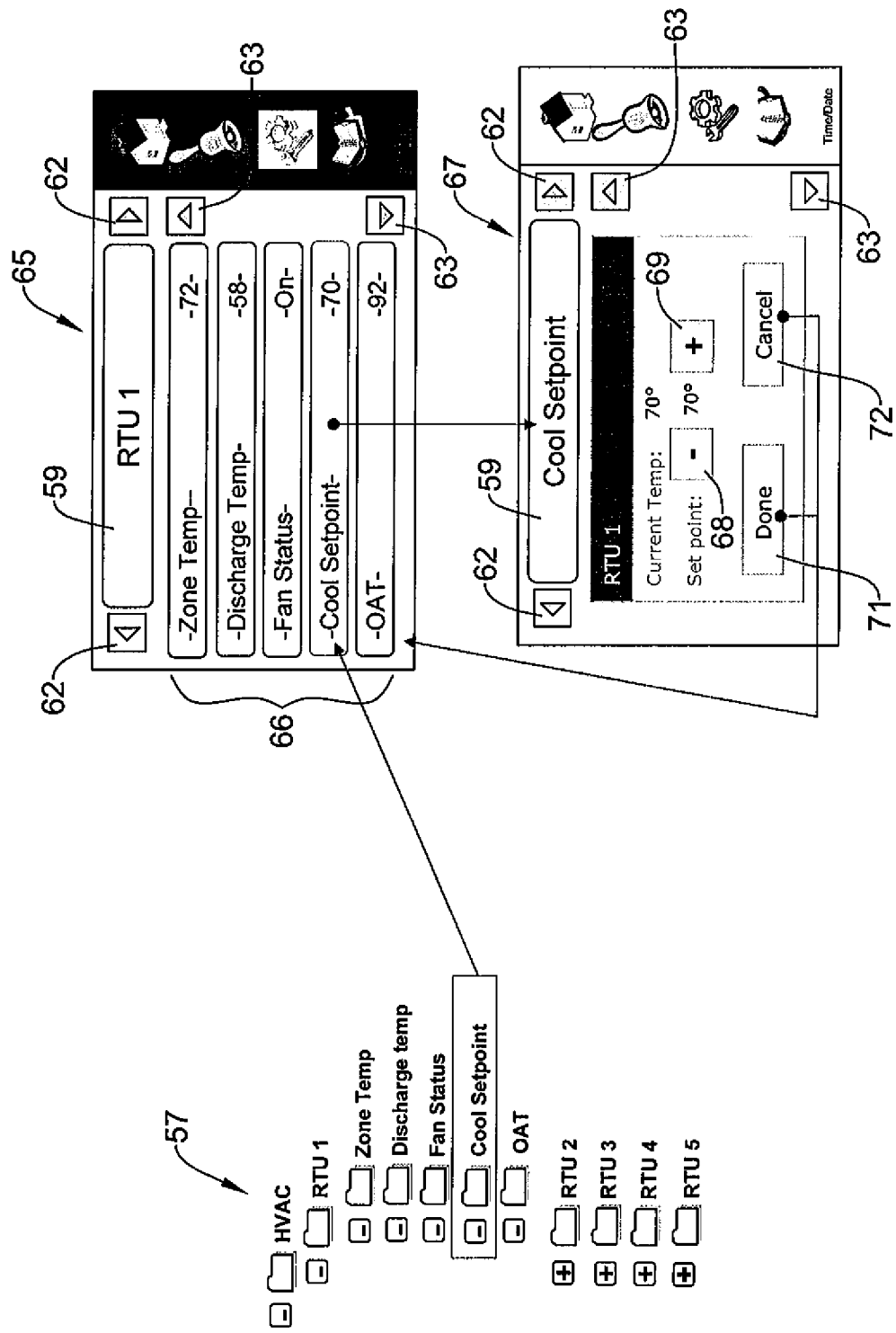

FIGS. 15 through 28 illustrate story boards for "use cases" of various components of a building automation or building control system. FIGS. 15 through 17, for instance, show a story board for an HVAC use case. An Opus™ Supervisory Nav Tree 51 is shown in FIG. 15. A Panorama™ display of screen 52 may correspond to tree 51, with the title folder or button 53 corresponding to the title block 54 of the screen 52. Folder 53 may be renamed to change the name or title in block or button 54 of screen 52. Subfolders 55, entitled Point 1 through Point 5, may correspond to blocks or buttons 56 in screen 52, likewise entitled Point 1 through Point 5. Folders 53 and 55 may be renamed in the tree to result in new names in the newly named tree 57, with HVAC in lieu of Title and RTU 1 through RTU 5 in lieu of Point 1 through Point 5. The names of tree 57 are reflected in a screen 58 with a name of HVAC in block or button 59 and names RTU 1 through RTU 5 in blocks or buttons 61. Buttons 62 may be pressed to navigate between category types, such as HVAC, lighting, refrig and so on, at a same hierarchical menu level. Buttons 63 may be pressed to navigate to a next or previous item or page of items indicated by blocks or buttons 56 and 61 of screens 52 and 58, respectively.

FIG. 16 shows screen 58 of FIG. 15 and an approach to go to another level of items. A home page or menu like that in screen 21 of FIG. 1, showing the components, such as HVAC, lighting, alarms, refrig and so forth, of a building automation or control system may be regarded as level 1 of a menu hierarchy for illustrative purposes. Screen 58 of HVAC or another component of level 1, showing RTU's, along with parameter values at the right of the respective buttons or blocks 61, or corresponding items of another component, respectively, may be regarded as a level 2. One may click on an RTU item of the HVAC tree 57 or press a block or button of blocks or buttons 61 (hereafter, button or block may be used interchangeably). Such click or press may result in showing in items of, for example, RTU 1 as shown by a portion 64 of tree 57 and shown in screen 65. Screen 65 may be regarded as a level 3. The items 66 of RTU 1, as indicated by a label or button 59, are zone temperature, discharge temperature, fan status, cool setpoint and OAT (outside air temperature) with their values to the right of the respective buttons 66. The highlighted items or buttons 66 may be writeable. If one wants to navigate to RTU 2, pressing the next button 62, for instance, to the right may bring the user to a list of items 66 for RTU 2. However, the user may want to click on the cool setpoint item 66 of RTU 1 to go to a level 4 of the menu hierarchy as shown by a screen 67 in FIG. 17. Any other item 66 of RTU 1 may be pressed to display a hierarchical level 4 for the respective item 66.

Screen 67 shows the title of item 66 in block 59. Also shown is the setpoint which may be adjusted by up (+) and down (−) buttons 69 and 68, respectively. If the setpoint is changed, it may be accepted by pressing a done button 71 or rejected by pressing a cancel button 72. Highlighted items 66 in screen 65 in FIG. 17 may be writable. Button 62 to the right in screen 67 may be pressed to go to the next item 66 of RTU 1 at the same hierarchical level. This may be regarded as horizontal navigation.

Figure 18:
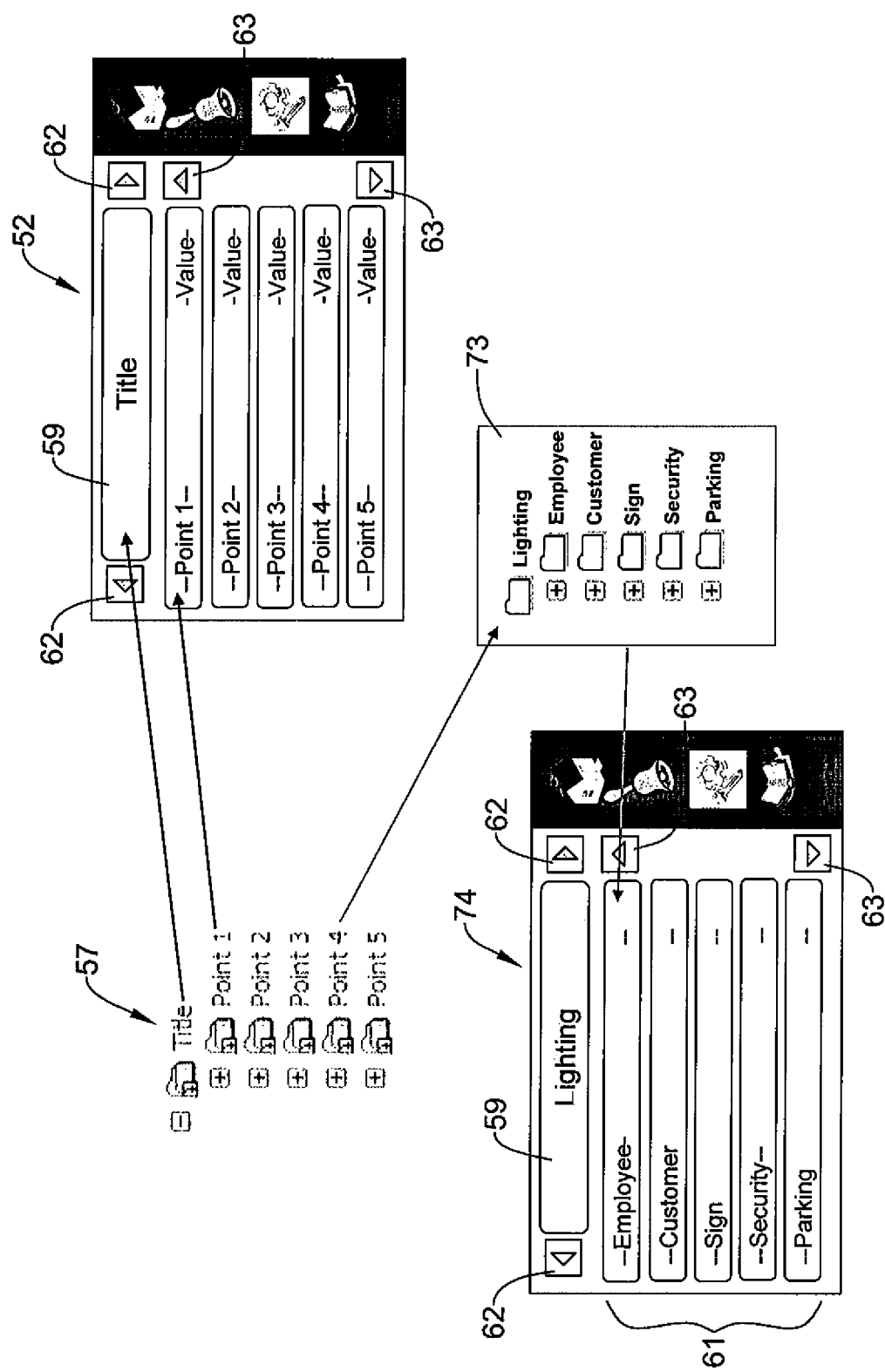

One may navigate at hierarchical level 2 in screen 58 of FIG. 16 to screen 74 of FIG. 18, that is, from one component to another component, such as from HVAC to lighting, of the building automation or control system, by pressing a button 62. The folders of tree 57 may be renamed as indicated for lighting in box 73 for screen 74. The title "lighting" may be in block 59 and the items 61 may indicate the various areas of lighting.

Figure 19:
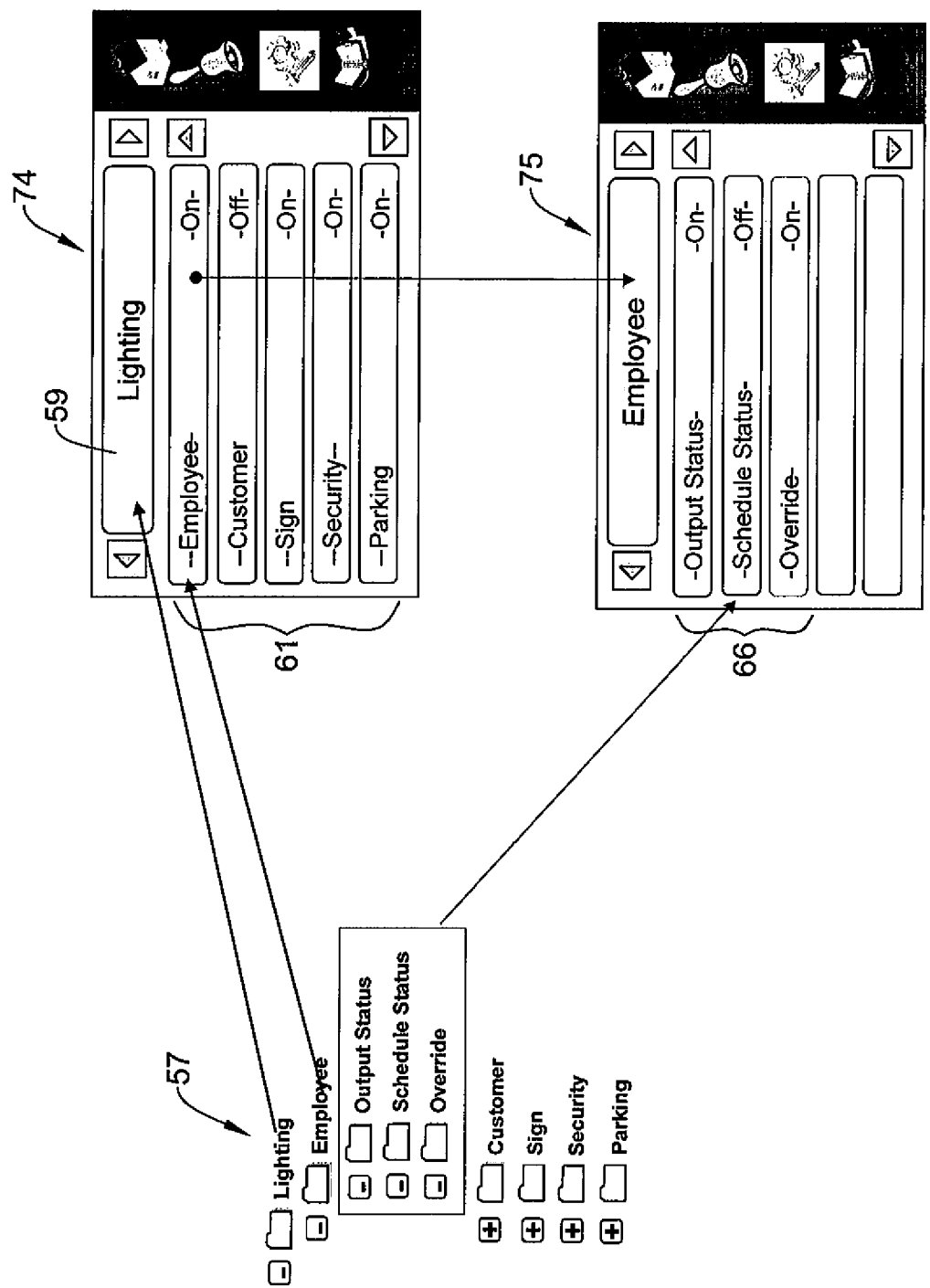
Figure 20:
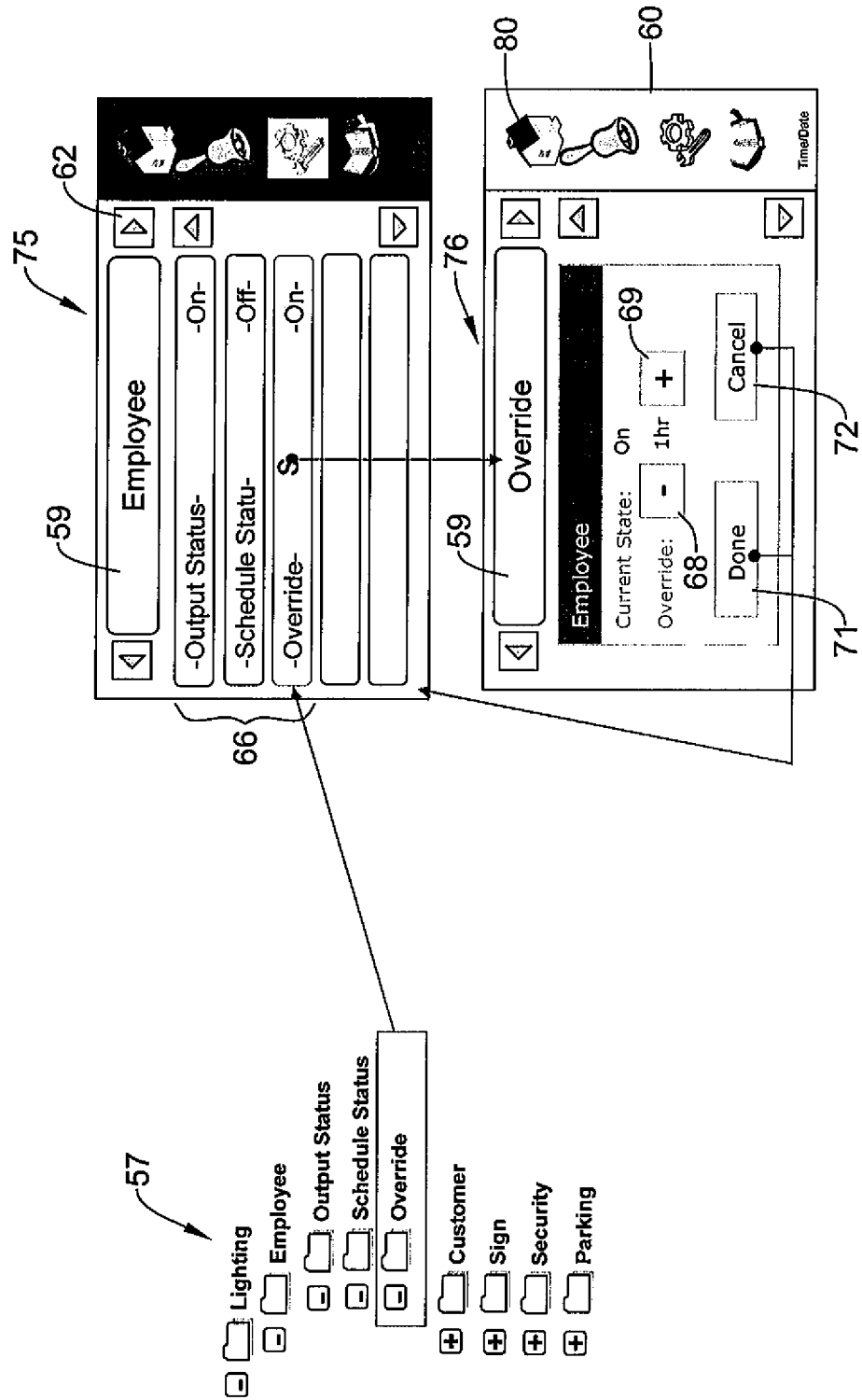

In FIG. 18, the user may press an item or button 61 in screen 74, such as employee, to get a hierarchical level 3 screen 75 of detail items 66 for employee item 61 as shown in FIG. 19. Items 66 may include output status, schedule status and override with their values indicated to the right of the respective title. One of the items or buttons 66 in screen 75 may be pressed to get to the detail of the respective item 66. For instance, the override button 66 may be pressed to obtain a hierarchical level 4 with an override as shown by screen 76 in FIG. 20. The current state of the override for the employee lighting may be changed with buttons 68 and 69. If the state is changed, it may be accepted by pressing the done button 71 or rejected by pressing the cancel button 72.

Figure 21:
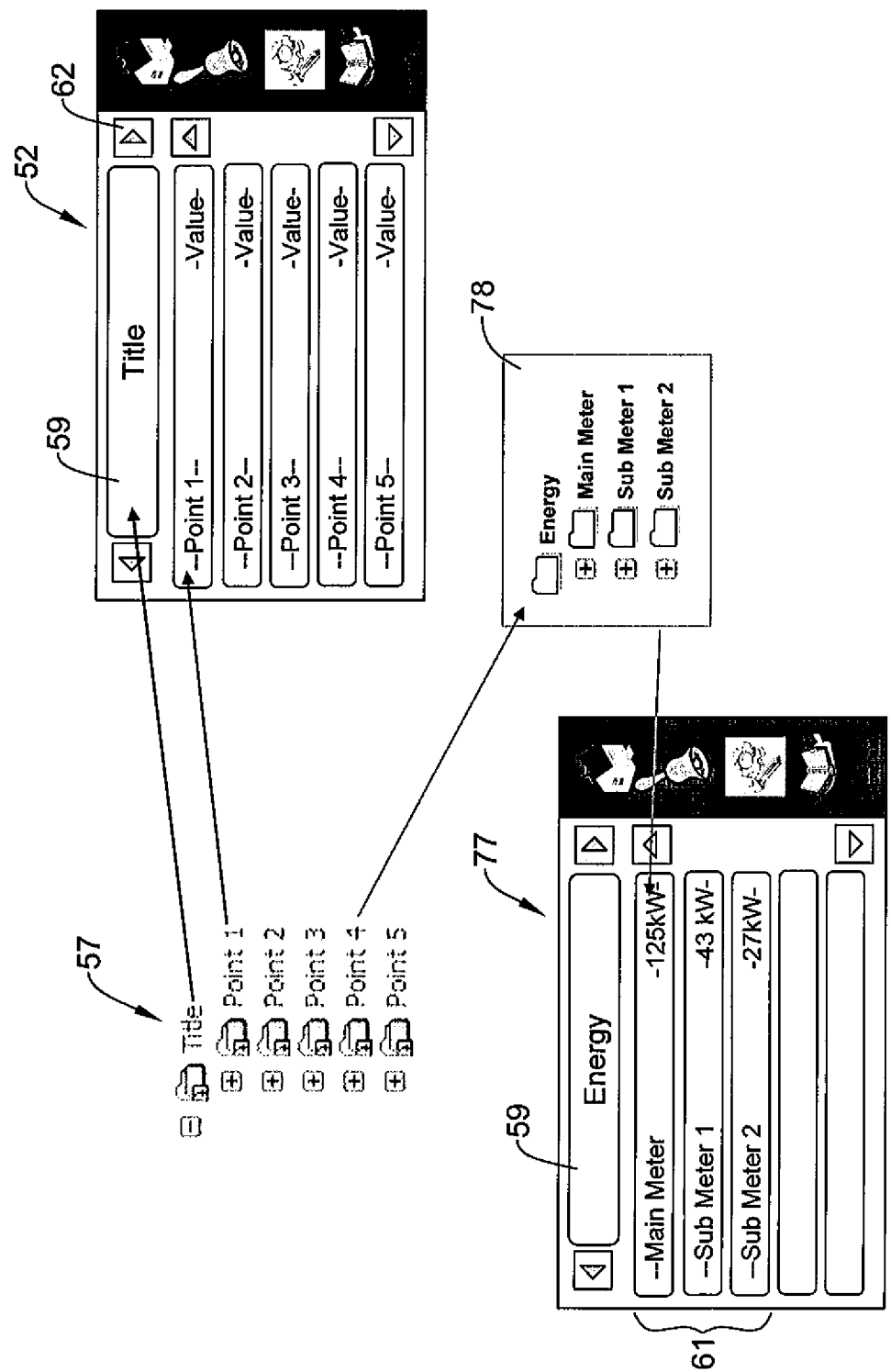

In FIG. 21, the user may navigate to another component of the menu hierarchy of the building automation or control system in screen 74 of FIG. 18 by pressing button 62. One, for example, may move from lighting to energy horizontally at the hierarchical level 2. However, one may move vertically from hierarchical level 4 of the override screen 76 in FIG. 20 to the home page and select the respective component. That move may be accomplished by pressing the home component icon 80 in box 60 at the right portion of the screen. The title in block 59 of the other component may be "energy" as indicated in screen 77 of FIG. 21. Items 61 may include main meter, sub-meter 1, and sub-meter 2 with the power levels indicated to the right of the respective titles. The folders of tree 57 may be renamed, such as shown by tree 78.

Figure 22:
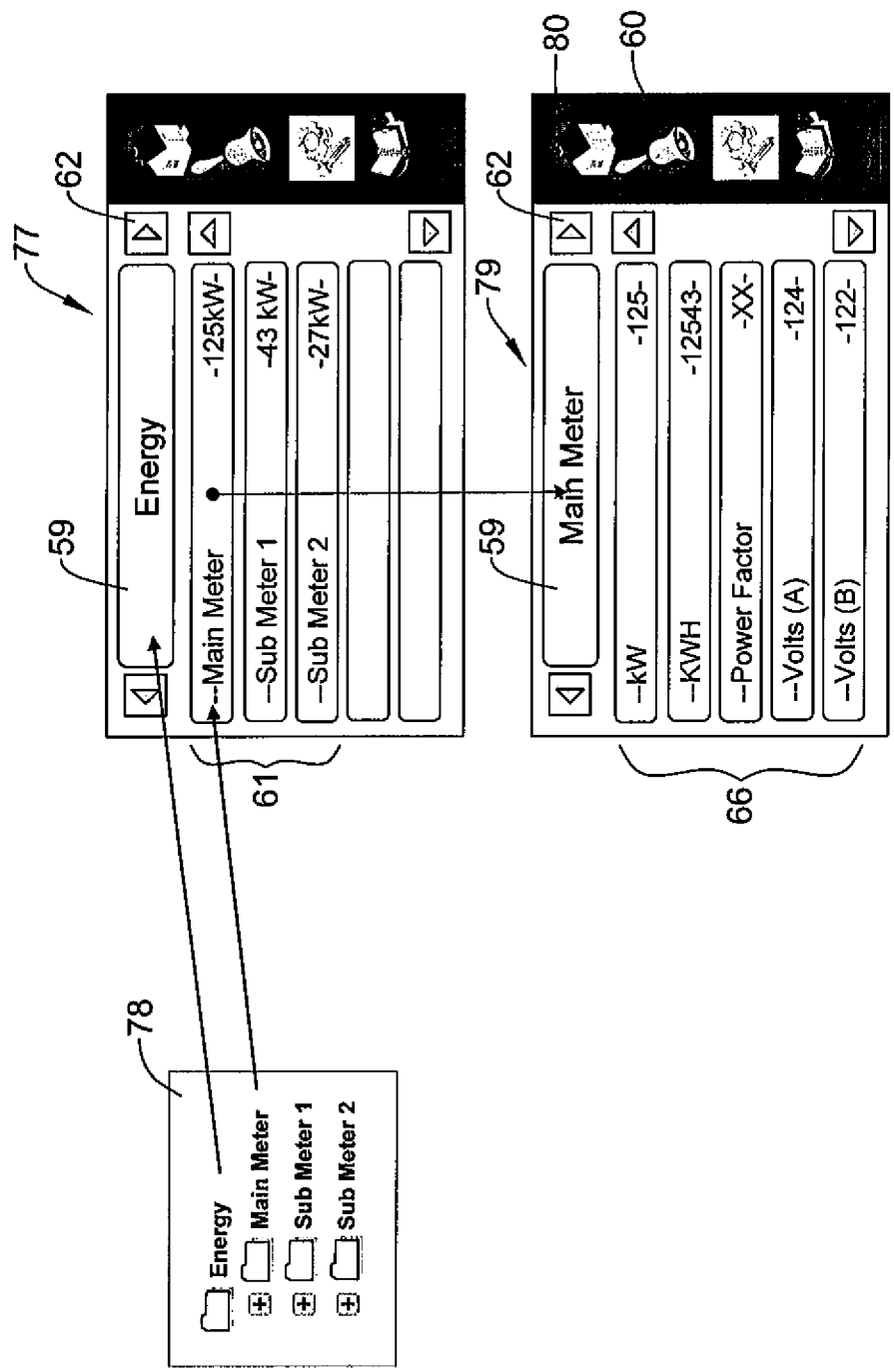

One of the items or buttons 61 may be pressed to get to the hierarchical level 3 for the energy component. For instance, the main meter button 61 may be pressed to get a screen 79 at the hierarchical level 4 for items 66 of the main meter, as shown in FIG. 22. Items 66 may include KW, KWH, power factor, volts (A) and volts (B), with values to the right of the labels of the items.

Figure 23:
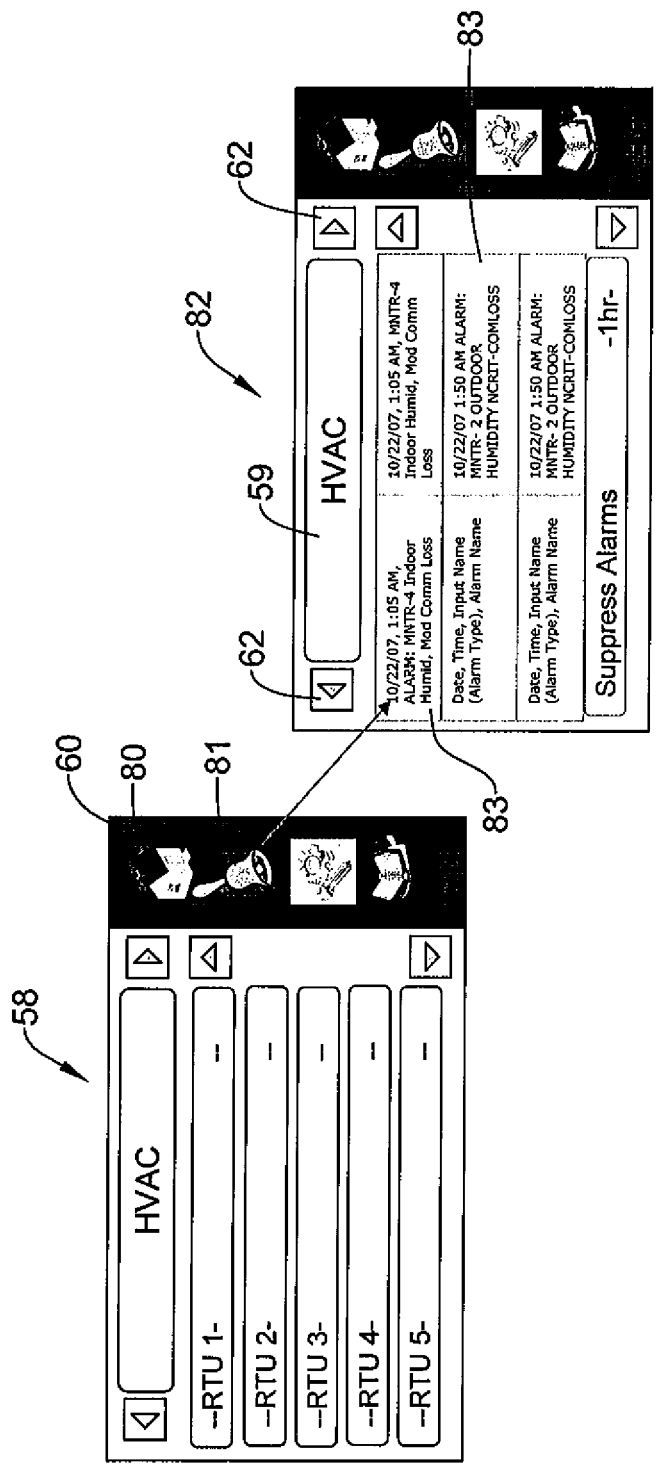

In FIG. 23, the user may return to the screen 58 for the HVAC component. HVAC is merely an illustrative example component since another component may be selected. Current alarms for HVAC may be viewed by pressing an alarm icon 81 in box 60 to get an alarm screen 82. Alarm screen 82 reveals alarms 83 that have occurred including date, time, the component and/or the problem, since the user last reviewed and reset the alarms. In screen 82, one may navigate in a horizontal manner between components to see alarms for other components such as lighting, energy, refrig, and so forth, by pressing either button 62.

Figure 24:
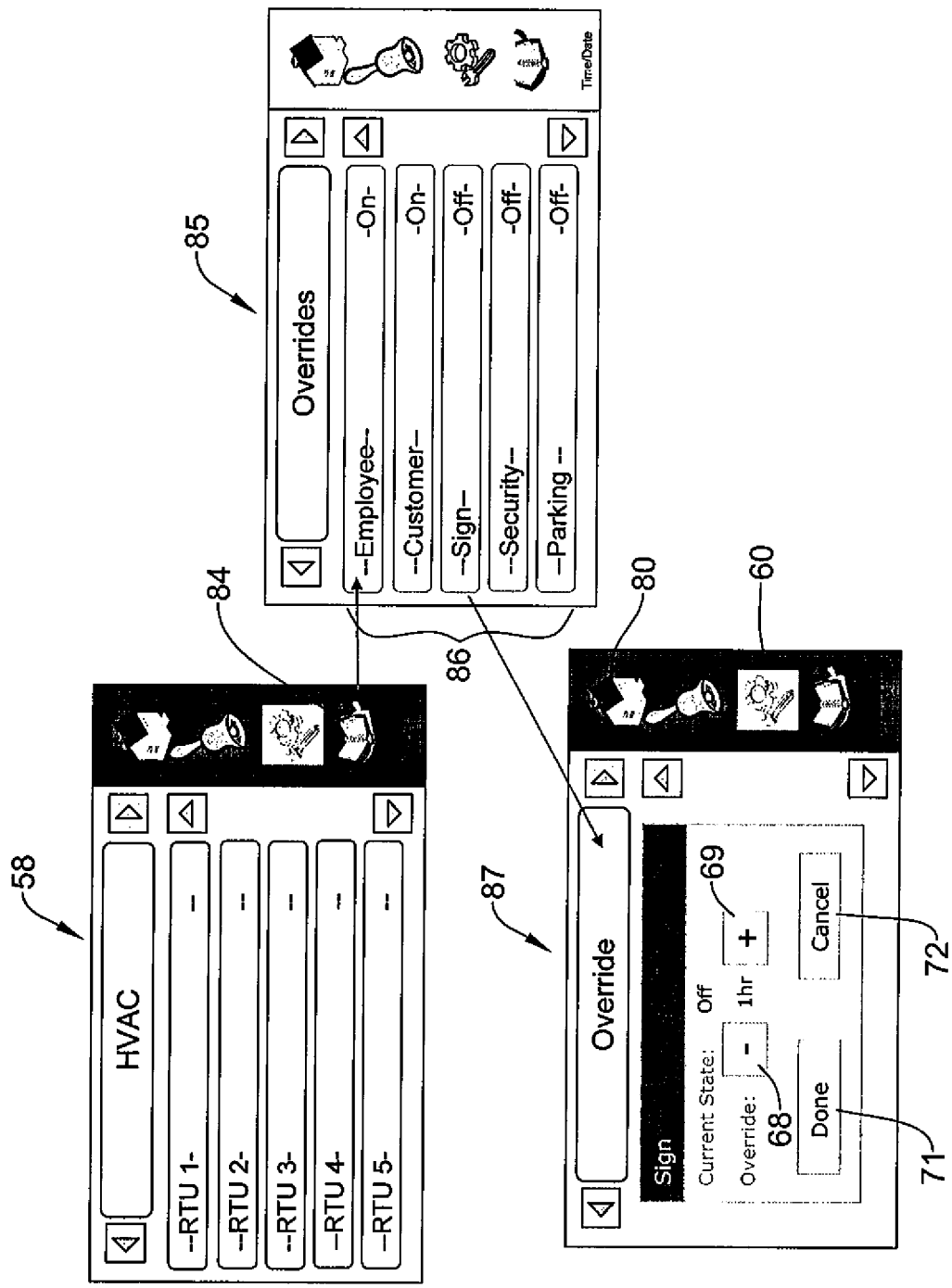

In FIG. 24, the user may return to screen 58 for the HVAC or a screen for another component. One may press an icon 84 to reveal the overrides as shown in screen 85 of FIG. 24. Time overrides may be executed. The overrides for items 86 may include lighting for employee, customer, sign, security, parking, and so forth, areas, shown as items 61 in FIG. 61, with the status of the override indicated in the item or button of the respective item 86. One of the items 86 may be pressed to go to a next level of the menu hierarchy. For instance, pressing a sign button 86 may reveal a screen 87 for the sign override. The current state of the override may be changed with buttons 68 and 69. If the override state is changed, then the change may be accepted by pressing the done button 71 or be rejected by pressing the cancel button 72.

Figure 25:
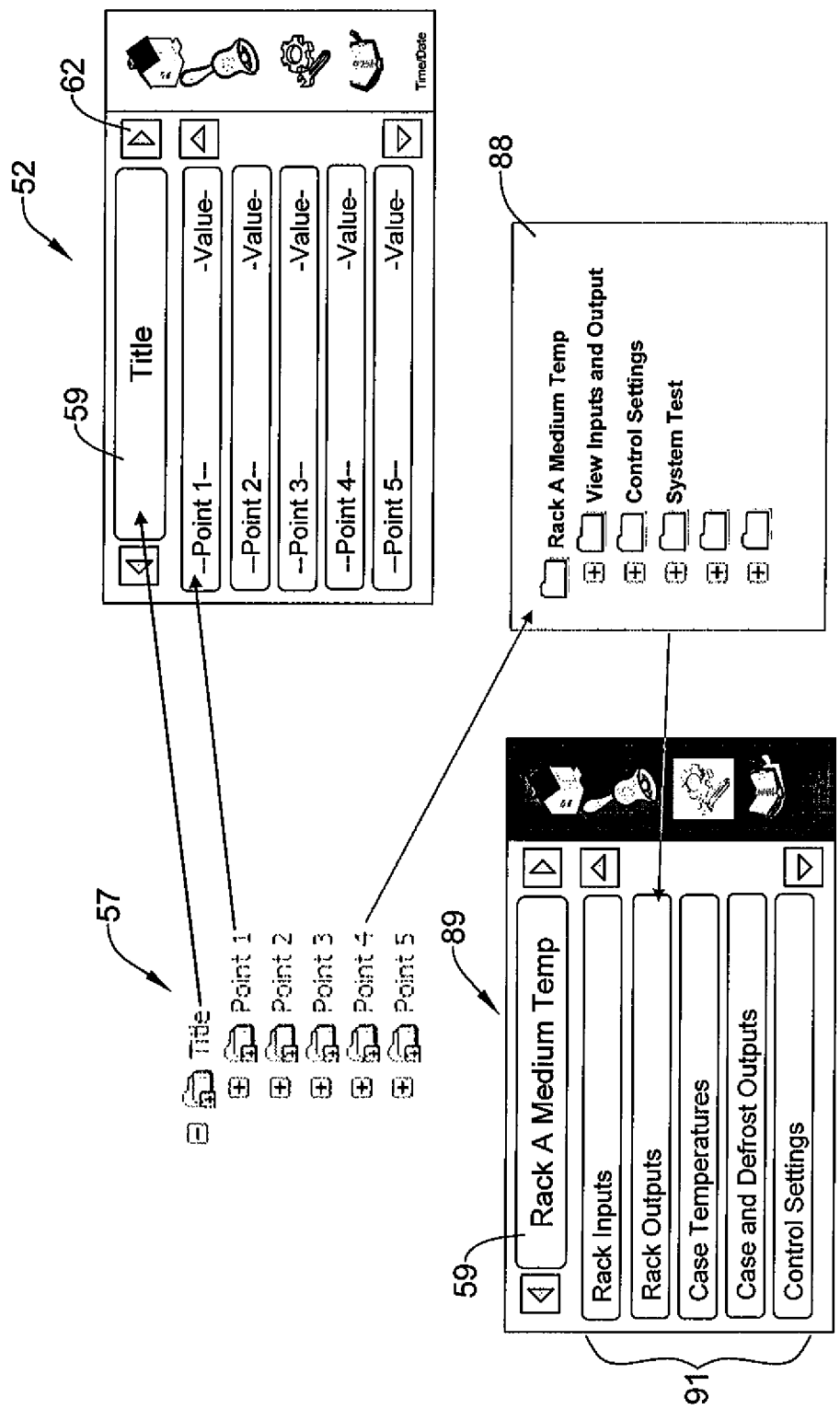
Figure 26:
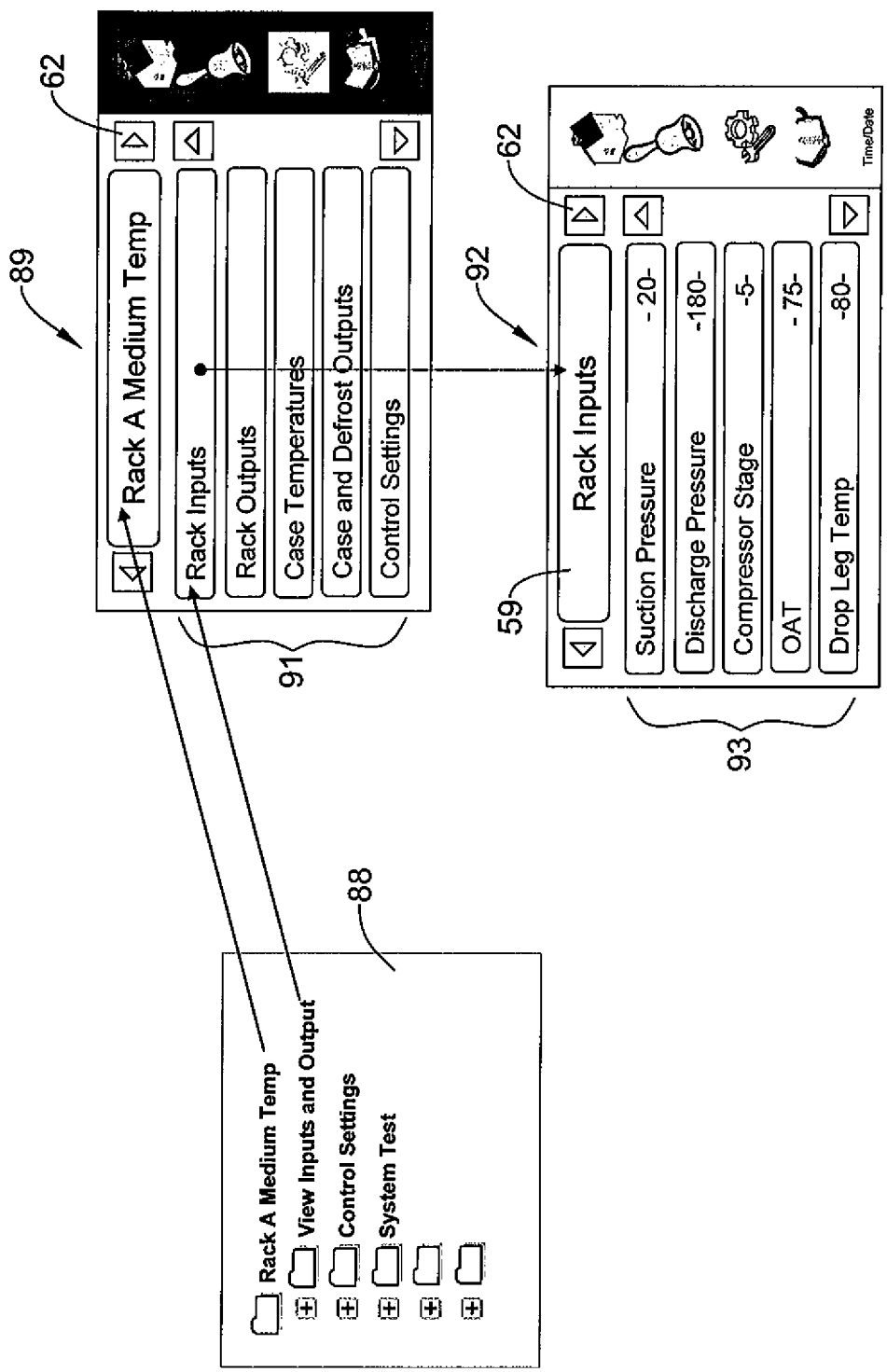

In FIG. 25, one may note the title screen 52 and corresponding tree 57. The folders of the tree may renamed with the title "rack a medium temp" as shown in block 88 with a corresponding screen 89 having items 91 such as rack inputs, rack outputs, case temperatures, case and defrost outputs and control setting. Screen 89 may be regarded as a level "n" of the menu hierarchy. Block 88 and corresponding screen 89 are shown in FIG. 26 to illustrate another screen 92 at a level "n+1" of the menu hierarchy for an item 91 such as rack inputs. Items 93 are shown in screen 92 for the rack inputs. Items 93 may include suction, pressure, discharge pressure, compressor stage, OAT, drop leg temp, and so forth, with status or parameter indications to the right of the respective titles of items 93.

Figure 27:
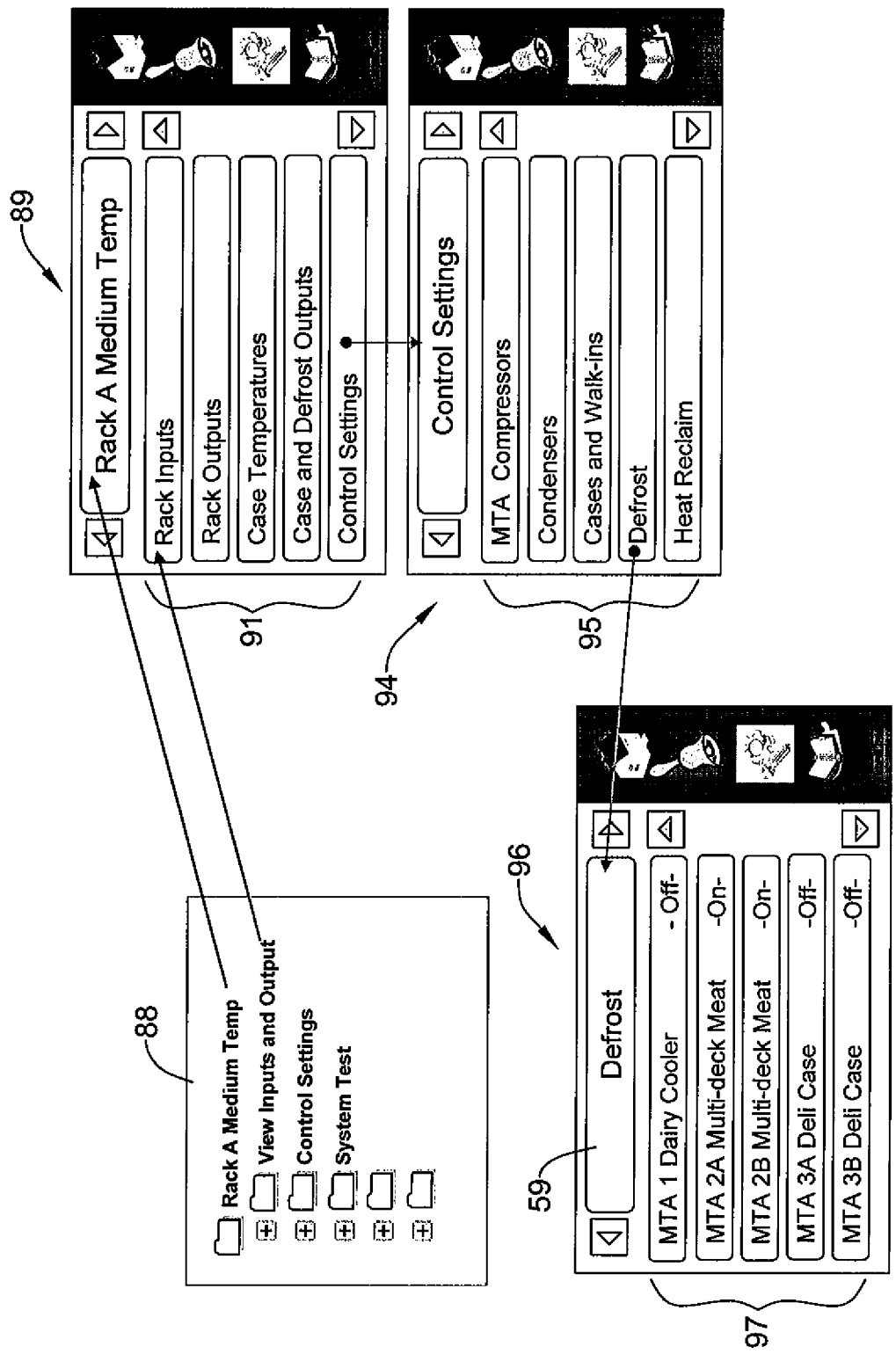

FIG. 27 shows the tree 88 along with corresponding screen 89 to show a selection of another item 91 such as control settings which may lead to a level "n+1" of the menu hierarchy with a screen 94 showing items or buttons 95 for control settings. Items 95 may include MTA compressors, condensers, cases and walk-ins, defrost, heat reclaim, and so forth. The user may go to a level "n+2" of the menu hierarchy by pressing one of the buttons 95, such as defrost. Pressing the defrost button or item 95 may lead to a screen 96 with defrost in the title block 59. Screen 96 may have items or buttons 97 listed for defrost. Items 97 may include MTA 1 dairy cooler, MTA 2A multi-deck meat, MTA 2B multi-deck meat, MTA 3A deli case, MTA 3B deli case, and so forth. The status of each item 97 may be indicated to the right of the respective title.

Figure 28:
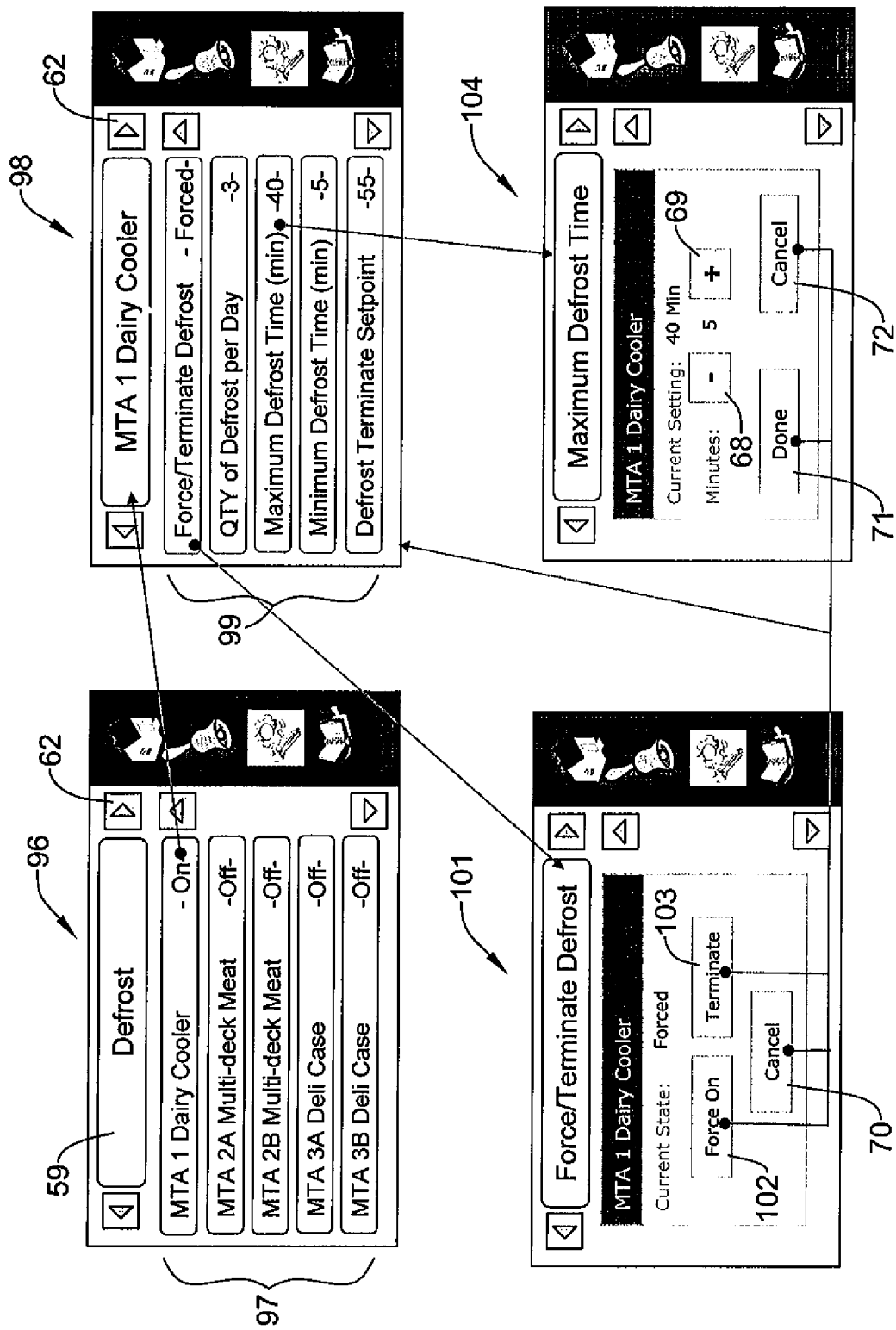

Screen 96 for defrost is also shown in FIG. 28. For a level "n+3" of the menu hierarchy, the user may press a button or item 97, such as MTA 1 dairy cooler as an illustrative example. This may result in a screen 98 having MTA 1 dairy cooler in the title block 59. Also in screen 98 may be items or buttons 99. Items 99 may include force/terminate defrost, QTY of defrost per day, maximum defrost time, minimum defrost time, defrost terminate setpoint, and so forth, with status, parameters or settings indicated at the right for each item 99, respectively.

One or more items or buttons 99 may be pressed obtain a level "n+4" of the menu hierarchy. For example, the force/ terminate defrost item or button 99 may be pressed to result in a screen 101 which shows the current state and buttons 102 and 103 for selecting the state. To terminate the force on, button 103 may be pressed, and to turn the force on, button 102 may be pressed. If a state has been changed, a cancel button 70 may be pressed to cancel either selection of buttons 102 and 103. Also, another item 99 of screen 98 may be pressed to get a screen 104 for the maximum defrost time. Buttons 68 and 69 may be pressed to change the setting of the maximum defrost time. If a change is entered, it may be accepted by pressing the done button 71 or rejected by pressing the cancel button 72. The done and cancel buttons 71 and 72 of screen 104 may be tied in with the force on, terminate and cancel buttons 102, 103 and 70 to coordinate the two items 99. In general, items 99 of screen 98 may be tied in with one another.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A building automation control system for controlling building automation equipment, the building automation control system comprising:
    a display device having a display and configured to display screens of the building automation control system on the display in response to input; and
    a sideways button configured to receive the input to cause the display device to change a screen from a displayed screen a selected rank or level of a tree or menu to a subsequent screen of an equivalent or equal rank or level of another tree or menu; and
    wherein:
        the display device is configured to display a home screen on the display, the home screen displays a plurality of building automation system components;
        in response to receiving input selecting a displayed building automation system component, the display device is configured to display a status screen for the selected building automation system component, where each status screen associated with a building automation system component has a status of the associated building automation system component at two or more locations;
        in response to receiving input at the sideways button when the display is displaying the status screen of the selected building automation system component, the display device is configured to display a status screen for a next building automation system component displayed on the home screen;
        in response to receiving input selecting a displayed location displayed in the status screen of the selected building automation system component, the display device is configured to display on the display an item screen for the selected location, where each item screen associated with a location has a list of items of the associated building automation system component at the selected location;
        in response to receiving input at the sideways button when the display is displaying the item screen at the selected location, the display device is configured to display an item screen for a next location displayed in the status screen of the associated building automation system component; and
    a plurality of device or location screens and a plurality of settings screens are configured to depict:
        a pair of selectable buttons selectable to advance or retreat through screens associated with options of a list of options in a screen previously displayed on the display device;
        a selectable back button selectable to display on the display device a previously displayed screen with the list of options; and
        a selectable home button selectable to display on the display device the home screen.

2. The building automation control system of claim 1, wherein:
    in response to receiving input selecting a displayed item displayed in the item screen of the selected location, the display device is configured to display on the display a set point screen for the selected item, where each set point screen associated with an item is configured to receive input to adjust the selected item; and
    in response to receiving input at the sideways button when the display is displaying the set point screen of the selected item, the display device is configured to display a set point screen for a next item displayed in the item screen of the associated location.

3. The building automation control system of claim 1, further comprising a home button configured to receive the input to cause the display device to change the displayed screen to the home screen when the displayed screen is not the home screen.

4. The building automation control system of claim 1, further comprising a back button configured to receive input to cause the display device to change the displayed screen to a screen immediately previously displayed.

5. The building automation control system of claim 4, wherein the screen immediately previously displayed is the home screen.

6. The building automation control system of claim 4, wherein the screen immediately previously displayed is a status screen for one of the building automation system components.

7. A method for operating a building automation control system, comprising:
    displaying on a display device a home screen showing two or more selectable building automation system components of a building control system;
    receiving a selection of a building automation system component from the two or more selectable building automation system components shown on the home screen;
    in response to the selecting the building automation system component, displaying on the display device a screen depicting two or more selectable devices or locations associated with the building automation system component selected;
    providing a comparison, in a side-by-side manner, of settings of a first device or a first location of the two or more devices or locations to settings of a second device or location of the two or more devices or locations, wherein the providing the comparison of settings comprises:
        receiving a selection of the first device or location depicted on the display device;

in response to receiving the selection of the first device or location, displaying on the display device a screen depicting settings of the first device or location selected;

while the settings of the first device or location are displayed, receiving a selection of a first button; and in response to selection of the first button, displaying on the display device a screen depicting settings of the second device or location; and wherein a plurality of device or location screens and a plurality of settings screens are configured to depict:
 a pair of selectable buttons selectable to advance or retreat through screens associated with options of a list of options in a screen previously displayed on the display device;
 a selectable back button selectable to display on the display device a previously displayed screen with the list of options; and
 a selectable home button selectable to display on the display device the home screen.

8. The method of claim 7, wherein providing the comparison of settings further comprises:
 while the settings of the first device or location are displayed, receiving a selection of a second button; and
 in response to the selection of the second button, displaying on the display device the screen depicting the settings of the first device or location.

9. The method of claim 8, the method further comprises:
 while one of the settings of the first device or location is displayed and the settings of the second device or location are displayed, receiving a selection of a third button;
 in response to the selection of the third button, displaying on the display device the home screen.

10. The method of claim 8, the method further comprises:
 while one of the settings of the first device or location is displayed and the settings of the second device or location are displayed, receiving a selection of a third button;
 in response to the selection of the third button, displaying on the display device the screen depicting the two or more selectable devices or locations associated with the building automation system component selected.

11. The method of claim 7, further comprising:
 on each of the screens depicting two or more selectable devices or locations associated with the building automation system component selected, the screen depicting settings of the first device or location selected, and the screen depicting settings of the second device or location, displaying:
  the first button;
  a second button, wherein the first button and the second button create a pair of buttons selectable to switch between screens of two or more comparable options.

12. The method of claim 11, receiving a selection of the second button causes the display device to display on each of the screen depicting two or more selectable devices or locations associated with the building automation system component selected, the screen depicting settings of the first device or location selected, and the screen depicting settings of the second device or location:
 a third button, wherein the third button is selectable to display on the display device:
  the home screen when selected from the screen depicting two or more selectable devices or locations; and
  the screen depicting the two or more selectable devices or locations when selected from the screen depicting settings of the first device or location selected, and the screen depicting settings of the second device or location; and
 a fourth button, wherein the fourth button is selectable to display on the home screen on the display device.

13. The method of claim 7, further comprising:
 receiving a selection of a setting of the settings of the first device or location displayed on the display device; and
 displaying a setting adjustment screen configured to receive inputs to adjust a set point of the setting selected.

14. The method of claim 13, further comprising:
 displaying the first button in the setting adjustment screen configured to receive inputs to adjust a set point of the setting selected;
 receiving a selection of the first button displayed in the setting adjustment screen configured to receive inputs to adjust a set point of the setting selected; and
 in response to receiving the selection of the first button displayed in the setting adjustment screen configured to receive inputs to adjust a set point of the setting selected, displaying a setting adjustment screen configured to receive inputs to adjust a set point a next setting of the settings of the first device or location.

15. A building automation control system comprising:
 a display device having a display and configured to display screens of the building automation control system on the display in response to input; and
 wherein:
  the display device is configured to display a home screen on the display, the home screen displays a plurality of building automation system components;
  the display device is configured to display one of a plurality of device or location screens in response to receiving a selection of one of the plurality of building automation system components, two or more of the plurality of the device or location screens depict a plurality of devices or locations associated with a building automation system component of the plurality of building automation system components;
  the display device is configured to display one of a plurality of settings screens in response to selection of one of the plurality of the devices or locations, where each settings screen is associated with a device or location of the plurality of devices or locations and two or more settings screens depict a plurality of settings; and
  wherein the plurality of device or location screens and the plurality of settings screens are configured to depict:
   a pair of selectable buttons selectable to advance or retreat through screens associated with options of a list of options in a screen previously displayed on the display device;
   a selectable back button selectable to display on the display device a previously displayed screen with the list of options; and
   a selectable home button selectable to display on the display device the home screen.

16. The building automation control system of claim 15, further comprising:
 the display device is configured to display one of a plurality of set point adjustment screens in response to selection of one of the plurality of settings, where each set point adjustment screen is associated with a setting of the plurality of settings and is configured to receive input to adjust a set point associated with the selected one of the plurality of settings; and wherein each of the plurality of set point adjustment screens is configured to display the pair of selectable buttons, the selectable back button, and the selectable home button.

17. The building automation control system of claim 15, wherein the pair of selectable buttons are selectable from a device or location screen associated with a selected building automation system component to scroll through device or location screens associated with other building automation system components of the plurality of building automation system components.

18. The building automation control system of claim 15, wherein the pair of selectable buttons are selectable from a settings screen associated with a selected device or location to settings screens associated with other devices or locations of the plurality of devices or locations.

19. The building automation control system of claim 15, wherein the plurality of device or location screens depicts a status for each of the plurality of devices or locations displayed.

20. The building automation control system of claim 15, wherein the plurality of settings screens depicts a setpoint status for each of the plurality of settings displayed.

* * * * *